US010375157B2

(12) United States Patent
Langseth et al.

(10) Patent No.: US 10,375,157 B2
(45) Date of Patent: Aug. 6, 2019

(54) SYSTEM AND METHOD FOR REDUCING DATA STREAMING AND/OR VISUALIZATION NETWORK RESOURCE USAGE

(71) Applicant: Zoomdata, Inc., Reston, VA (US)

(72) Inventors: Justin Langseth, Great Falls, VA (US); Ruhollah Farchtchi, Vienna, VA (US); Quan Cat Luu, Ashburn, VA (US); Matthew Robert Barrett, Catonsville, MD (US); Punit Rathore, Vienna, VA (US)

(73) Assignee: ZOOMDATA, INC., Reston, VA (US)

( * ) Notice: Subject to any disclaimer, the term of this patent is extended or adjusted under 35 U.S.C. 154(b) by 0 days.

(21) Appl. No.: 15/855,818

(22) Filed: Dec. 27, 2017

(65) Prior Publication Data

US 2018/0176290 A1 Jun. 21, 2018

Related U.S. Application Data

(62) Division of application No. 15/382,534, filed on Dec. 16, 2016, now Pat. No. 9,942,312.

(51) Int. Cl.
*H04L 29/08* (2006.01)
*H04L 12/911* (2013.01)
(Continued)

(52) U.S. Cl.
CPC .......... *H04L 67/101* (2013.01); *G06F 11/34* (2013.01); *H04L 47/125* (2013.01); *H04L 47/822* (2013.01); *H04L 67/1002* (2013.01)

(58) Field of Classification Search
CPC .................................................. H04L 67/1002
See application file for complete search history.

(56) References Cited

U.S. PATENT DOCUMENTS

| 4,769,772 A | 9/1988 | Dwyer |
| 6,026,397 A | 2/2000 | Sheppard |

(Continued)

FOREIGN PATENT DOCUMENTS

WO  WO 2014/011708  1/2014

OTHER PUBLICATIONS

Bennett et al., "Feature-Based Statistical Analysis of Combustion Simulation Data", IEEE Transactions on Visualization and Computer Graphics, vol. 17, No. 12, Dec. 2011, pp. 1822-1831 (10 pages).

(Continued)

*Primary Examiner* — Lashonda T Jacobs
(74) *Attorney, Agent, or Firm* — Pillsbury Winthrop Shaw Pittman LLP

(57) ABSTRACT

In some embodiments, data related to calculating a set of values may be obtained. The set of values may be approximated based on a subset of the related data. The approximated values may be stored at a first data storage and a second data storage that corresponds to a landing zone (via which a client device obtains at least some of the approximated values). The approximated values stored at the first data storage may be continuously updated based on further subsets of the related data such that the approximated values stored at the first data storage is updated at least a first number of times within a first time period. The approximated values stored at the second data storage may be continuously updated such that the approximated values stored at the second data storage is updated less than the first number of times within the first time period.

20 Claims, 8 Drawing Sheets

(51) Int. Cl.
*H04L 12/803* (2013.01)
*G06F 11/34* (2006.01)

(56) References Cited

U.S. PATENT DOCUMENTS

| | | | |
|---|---|---|---|
| 6,072,493 | A | 6/2000 | Driskell et al. |
| 6,505,246 | B1 | 1/2003 | Land et al. |
| 6,633,873 | B1 | 10/2003 | Nakamura |
| 6,912,649 | B2 | 6/2005 | Luick |
| 7,155,475 | B2 | 12/2006 | Agnoli et al. |
| 7,308,445 | B2 | 12/2007 | Bharat et al. |
| 7,333,974 | B2 | 2/2008 | Patterson |
| 7,340,409 | B1 | 3/2008 | Ulwick |
| 7,373,389 | B2 | 5/2008 | Rosenbaum et al. |
| 7,502,366 | B1 | 3/2009 | Erimli et al. |
| 7,543,061 | B2 | 6/2009 | Kumbalimutt et al. |
| 7,580,941 | B2 | 8/2009 | Narasayya et al. |
| 7,673,278 | B2 | 3/2010 | Rathsack et al. |
| 7,680,781 | B1 | 3/2010 | Wasserman et al. |
| 7,688,322 | B2 | 3/2010 | Kapler et al. |
| 7,693,816 | B2 | 4/2010 | Nemoto et al. |
| 7,761,324 | B2 | 7/2010 | Amerasinghe et al. |
| 7,792,835 | B2 | 9/2010 | Bohannon et al. |
| 7,814,042 | B2 | 10/2010 | Ahmed |
| 7,822,658 | B2 | 10/2010 | Casati et al. |
| 8,027,854 | B2 | 9/2011 | Baggett et al. |
| 8,028,314 | B1 | 9/2011 | Sezan et al. |
| 8,090,715 | B2 | 1/2012 | Matias |
| 8,095,935 | B2 | 1/2012 | Paramasivam et al. |
| 8,122,223 | B2 | 2/2012 | Cantin et al. |
| 8,140,698 | B2 | 3/2012 | Codella et al. |
| 8,180,720 | B1* | 5/2012 | Kovacs ............... H04L 67/2842 706/47 |
| 8,489,982 | B2 | 7/2013 | Davis |
| 8,521,574 | B1 | 8/2013 | Rajan et al. |
| 8,539,565 | B2 | 9/2013 | Beletski et al. |
| 8,542,117 | B1 | 9/2013 | Miasnik et al. |
| 8,566,786 | B2 | 10/2013 | Snodgrass et al. |
| 8,589,503 | B2 | 11/2013 | Alperovitch et al. |
| 8,631,325 | B1 | 1/2014 | Langseth et al. |
| 8,849,730 | B2 | 9/2014 | Winn et al. |
| 8,892,638 | B2 | 11/2014 | Chang et al. |
| 8,938,688 | B2 | 1/2015 | Bradford et al. |
| 8,959,108 | B2 | 2/2015 | Pereira et al. |
| 8,972,434 | B2 | 3/2015 | English et al. |
| 9,047,616 | B2 | 6/2015 | Schnabl et al. |
| 9,069,864 | B2 | 6/2015 | Liu |
| 9,154,549 | B2 | 10/2015 | Sundararaj |
| 9,172,809 | B1 | 10/2015 | Mockus et al. |
| 9,235,637 | B1* | 1/2016 | Kamvar ............... G06F 16/3325 |
| 9,251,276 | B1 | 2/2016 | Langseth et al. |
| 9,357,020 | B2 | 5/2016 | Ishida et al. |
| 9,507,718 | B2 | 11/2016 | Rash et al. |
| 9,521,176 | B2 | 12/2016 | Agnoli et al. |
| 9,563,657 | B2 | 2/2017 | Martins |
| 2002/0078075 | A1 | 6/2002 | Colson et al. |
| 2002/0091994 | A1 | 7/2002 | McCready et al. |
| 2003/0158913 | A1* | 8/2003 | Agnoli .................... H04L 29/06 709/219 |
| 2003/0177338 | A1 | 9/2003 | Luick |
| 2003/0182261 | A1* | 9/2003 | Patterson ............ H04L 67/1036 |
| 2003/0225644 | A1 | 12/2003 | Casati et al. |
| 2004/0193631 | A1 | 9/2004 | Kumashio |
| 2004/0221053 | A1 | 11/2004 | Codella et al. |
| 2005/0015492 | A1* | 1/2005 | Kumbalimutt ...... H04L 67/1006 709/226 |
| 2005/0234890 | A1 | 10/2005 | Enzler et al. |
| 2006/0041537 | A1 | 2/2006 | Ahmed |
| 2006/0106759 | A1 | 5/2006 | Nemoto et al. |
| 2006/0277308 | A1 | 12/2006 | Morse et al. |
| 2006/0293872 | A1 | 12/2006 | Zamora et al. |
| 2007/0162425 | A1 | 7/2007 | Betawadkar-Norwood |
| 2007/0208607 | A1 | 9/2007 | Amerasinghe et al. |
| 2007/0239645 | A1* | 10/2007 | Du ........................ G06N 5/04 706/45 |
| 2007/0288495 | A1 | 12/2007 | Narasayya et al. |
| 2008/0065588 | A1 | 3/2008 | Aldrich |
| 2008/0154827 | A1 | 6/2008 | Connors |
| 2009/0132906 | A1 | 5/2009 | Aoki |
| 2009/0144103 | A1 | 6/2009 | Malov et al. |
| 2009/0150343 | A1 | 6/2009 | English et al. |
| 2009/0177988 | A1 | 7/2009 | Martins |
| 2009/0241176 | A1* | 9/2009 | Beletski ................. G06F 9/505 726/7 |
| 2009/0254663 | A1 | 10/2009 | Alperovitch et al. |
| 2009/0259522 | A1 | 10/2009 | Rapferport et al. |
| 2009/0287814 | A1 | 11/2009 | Robertson et al. |
| 2009/0300544 | A1 | 12/2009 | Psenka et al. |
| 2009/0322755 | A1 | 12/2009 | Holm-Peterson et al. |
| 2009/0328054 | A1* | 12/2009 | Paramasivam ....... G06F 9/5033 718/105 |
| 2010/0010984 | A1 | 1/2010 | Matias |
| 2010/0017740 | A1 | 1/2010 | Gonzalez Veron |
| 2010/0088258 | A1 | 4/2010 | Oaten et al. |
| 2010/0153429 | A1 | 6/2010 | Xu et al. |
| 2010/0162152 | A1 | 6/2010 | Allyn et al. |
| 2011/0137896 | A1 | 6/2011 | Masunaga et al. |
| 2011/0202841 | A1 | 8/2011 | Dempster et al. |
| 2011/0246388 | A1 | 10/2011 | Zhang |
| 2012/0022707 | A1 | 1/2012 | Budhraja et al. |
| 2012/0089920 | A1 | 4/2012 | Eick |
| 2012/0095958 | A1 | 4/2012 | Pereira et al. |
| 2012/0151399 | A1 | 6/2012 | Soerensen et al. |
| 2012/0203762 | A1 | 8/2012 | Kakarlamudi |
| 2012/0271748 | A1 | 10/2012 | Disalvo |
| 2012/0299965 | A1 | 11/2012 | Agarwal et al. |
| 2013/0083031 | A1 | 4/2013 | Lehnherr et al. |
| 2013/0086039 | A1 | 4/2013 | Salch et al. |
| 2013/0097599 | A1 | 4/2013 | Konik et al. |
| 2013/0111467 | A1* | 5/2013 | Sundararaj ............. G06F 9/505 717/176 |
| 2013/0159283 | A1 | 6/2013 | Broll et al. |
| 2013/0173707 | A1 | 7/2013 | Ishida et al. |
| 2013/0262436 | A1 | 10/2013 | Barsness |
| 2013/0268520 | A1 | 10/2013 | Fisher et al. |
| 2013/0290298 | A1 | 10/2013 | Weyerhaeuser et al. |
| 2013/0297646 | A1 | 11/2013 | Watari |
| 2013/0304798 | A1* | 11/2013 | Chang ....................... G06F 9/54 709/203 |
| 2014/0156343 | A1 | 6/2014 | Olsen |
| 2014/0229462 | A1* | 8/2014 | Lo ........................ G06F 16/951 707/707 |
| 2014/0258382 | A1 | 9/2014 | Tomer et al. |
| 2014/0358634 | A1 | 12/2014 | Schnabl et al. |
| 2014/0359471 | A1 | 12/2014 | Roundtree et al. |
| 2015/0032768 | A1 | 1/2015 | Miller et al. |
| 2015/0046429 | A1 | 2/2015 | Eblighatian |
| 2015/0046449 | A1 | 2/2015 | Langseth et al. |
| 2015/0046815 | A1 | 2/2015 | Langseth et al. |
| 2015/0112965 | A1 | 4/2015 | Tokuda et al. |
| 2015/0112966 | A1 | 4/2015 | Tokuda et al. |
| 2015/0149435 | A1 | 5/2015 | McKenna et al. |
| 2015/0154256 | A1 | 6/2015 | McKenna et al. |
| 2015/0178133 | A1 | 6/2015 | Phelan et al. |
| 2015/0254307 | A1* | 9/2015 | Johnson ............... G06F 16/2425 707/763 |
| 2015/0269228 | A1 | 9/2015 | Fisher |
| 2015/0324356 | A1 | 11/2015 | Andres Gutierrez et al. |
| 2015/0341407 | A1* | 11/2015 | Agnoli ..................... H04L 65/60 709/219 |
| 2016/0004744 | A1 | 1/2016 | Eriksson |
| 2016/0063058 | A1 | 3/2016 | Spehr et al. |
| 2016/0063118 | A1* | 3/2016 | Campbell ........... G06F 16/9535 707/722 |
| 2016/0321270 | A1 | 11/2016 | Hansson et al. |

OTHER PUBLICATIONS

Keim et al., "Information Visualization and Visual Data Mining", IEEE Transactions on Visualization and Computer Graphics, vol. 8, No. 1, Jan.-Mar. 2002, pp. 1-8.

(56) References Cited

OTHER PUBLICATIONS

Kandel et al., "Enterprise Data Analysis and Visualization: An Interview Study", IEEE Transactions on Visualization and Computer Graphics, vol. 18, No. 12, Dec. 2012, pp. 2017-2026 (10 pages).
Pham et al., "Visualization of Diversity in Large Multivariate Data Sets", IEEE Transactions on Visualization and Computer Graphics, vol. 16, No. 6, Nov./Dec. 2010, pp. 1053-1062 (10 pages).
Rubel et al., "Integrating Data Clustering and Visualization for the Analysis of 3D Gene Expression Data", IEEE/ACM Transactions on Computational Biology and Bioinformatics, vol. 7, No. 1, Jan.-Mar. 2010, pp. 64-79 (16 pages).
Yu et al., "Visual Mining of Multimedia Data for Social and Behavioral Studies", IEEE Symposium on Visual Analytics Science and Technology, Oct. 21-23, 2008, pp. 155-162 (8 pages).
Notice of Allowance as issued in U.S. Appl. No. 13/963,668, dated Nov. 8, 2013.
Non-Final Office Action as issued in U.S. Appl. No. 14/153,664, dated Jan. 15, 2016.
Notice of Allowance as issued in U.S. Appl. No. 14/153,664, dated May 25, 2016.
Non-Final Office Action as issued in U.S. Appl. No. 14/153,690, dated Dec. 15, 2015.
Notice of Allowance as issued in U.S. Appl. No. 14/153,690, dated Apr. 18, 2016.
Final Office Action as issued in U.S. Appl. No. 14/634,680, dated Oct. 20, 2015.
Non-Final Office Action as issued in U.S. Appl. No. 14/634,680, dated Apr. 23, 2015.
Mensa, Robert et al., "Dynamic Excel chart with dynamic title based on cell selection", 2009, Mourad Louha, 8 pages.
Notice of Allowance as issued in U.S. Appl. No. 14/634,680, dated Nov. 9, 2015.
Final Office Action as issued in U.S. Appl. No. 14/698,421, dated Jan. 4, 2016.
Non-Final Office Action as issued in U.S. Appl. No. 14/698,421, dated Aug. 21, 2015.
Non-Final Office Action as issued in U.S. Appl. No. 15/010,986, dated Jul. 25, 2016.
Non-Final Office Action as issued in U.S. Appl. No. 15/188,975, dated Aug. 19, 2016.
Notice of Allowance as issued in U.S. Appl. No. 15/188,975, dated Nov. 28, 2016.
Non-Final Office Action as issued in U.S. Appl. No. 15/190,153, dated Oct. 14, 2016.
Non-Final Office Action as issued in U.S. Appl. No. 15/197,733, dated Nov. 3, 2016.
Final Office Action dated Feb. 9, 2017 in corresponding U.S. Appl. No. 15/010,986 (29 pages).
Non-Final Office Action dated Feb. 17, 2017 in corresponding U.S. Appl. No. 15/382,522 (24 pages).
Non-Final Office Action dated Feb. 17, 2017 in corresponding U.S. Appl. No. 15/382,249 (15 pages).
Non-Final Office Action dated Feb. 22, 2017 in corresponding U.S. Appl. No. 15/382,513 (25 pages).
Non-Final Office Action dated Feb. 28, 2017 in corresponding U.S. Appl. No. 15/382,510 (26 pages).
Non-Final Office Action dated Mar. 21, 2017 in corresponding U.S. Appl. No. 15/409,499 (34 pages).
Non-Final Office Action dated Mar. 13, 2017 in corresponding U.S. Appl. No. 15/428,136 (19 pages).
Notice of Allowance dated Mar. 31, 2017 in corresponding U.S. Appl. No. 15/197,733 (16 pages).
Final Office Action dated Apr. 27, 2017 in corresponding U.S. Appl. No. 15/190,153 (17 pages).
Final Office Action dated Jul. 12, 2017 in corresponding U.S. Appl. No. 15/382,513 (27 pages).
Notice of Allowance dated Jul. 13, 2017 in corresponding U.S. Appl. No. 15/409,499 (9 pages).
Notice of Allowance dated Jun. 30, 2017 in corresponding U.S. Appl. No. 15/010,986 (10 pages).
Final Office Action dated Aug. 21, 2017 in corresponding U.S. Appl. No. 15/382,522 (23 pages).
Final Office Action dated Sep. 1, 2017 in corresponding U.S. Appl. No. 15/362,510 (33 pages).
Final Office Action dated Sep. 7, 2017 in corresponding U.S. Appl. No. 15/382,249 (18 pages).

* cited by examiner

SYSTEM AND METHOD FOR REDUCING DATA STREAMING AND/OR VISUALIZATION NETWORK RESOURCE USAGE

CROSS-REFERENCE TO RELATED APPLICATIONS

This application is a division of U.S. patent application Ser. No. 15/382,534, filed Dec. 16, 2016 and entitled "SYSTEM AND METHOD FOR FACILITATING LOAD REDUCTION AT A LANDING ZONE," which is related to the following applications, filed on Dec. 16, 2016: (1) U.S. patent application Ser. No. 15/382,510, (2) U.S. patent application Ser. No. 15/382,249, (3) U.S. patent application Ser. No. 15/382,513, and (4) U.S. patent application Ser. No. 15/382,522, each of which is hereby incorporated by reference herein in its entirety.

FIELD OF THE INVENTION

The invention relates to data streaming and/or visualization services, including, for example, providing network resource usage reduction related to data streaming and/or visualization services via an architecture designed to provide a lower frequency of updates to a set of results stored at a given data storage corresponding to a landing zone.

BACKGROUND OF THE INVENTION

In recent years, data visualization has become an increasingly important part of data analysis. Visualization, for example, enables companies and other organizations to meaningfully present raw data to facilitate effective and efficient analysis of the data. Obtaining and/or processing the raw data to produce a visualization of the data, however, can be a challenge. When visualizing "big data," for example, the costs related to obtaining and/or processing all of the data may be substantial. While advances in the performance of computer hardware have greatly increased the capabilities of servers and networks to obtain and process data as well as lowered the costs to do so, the amount of data available to be obtained and processed has grown exponentially in comparison to any advances in hardware performance. Moreover, because obtaining and/or processing of such data may be time consuming, users of typical data visualization systems generally experience considerable delay before being provided with substantive information related to their requests. These and other drawbacks exist.

SUMMARY OF THE INVENTION

Aspects of the invention relate to methods, apparatuses, and/or systems for facilitating network resource usage reduction related to data streaming and/or visualization services.

In some embodiments, network resource usage reduction related to data streaming and/or visualization services may be facilitated via an architecture designed to provide a lower frequency of updates to a set of results stored at a given data storage corresponding to a landing zone or via other techniques. As an example, predicted or other calculated values, representations of those calculated values, raw data for calculating those values, or other results (of the set of results) stored at the data storage (corresponding to the landing zone) may be updated less frequency than a frequency at which the set of results stored at another data storage is updated. In some embodiments, raw data relevant to a client-initiated query may be continuously streamed and processed to calculate updated results, and the updated results may be used to update a prior-calculated version of such results stored at a first data storage. The updated results stored at the first data storage may be used to update a prior-calculated version of such results stored at one or more other data storages (corresponding to one or more landing zones) such that the set of results stored at each of the other data storages is updated less frequently than the corresponding set of results stored at the first data storage.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
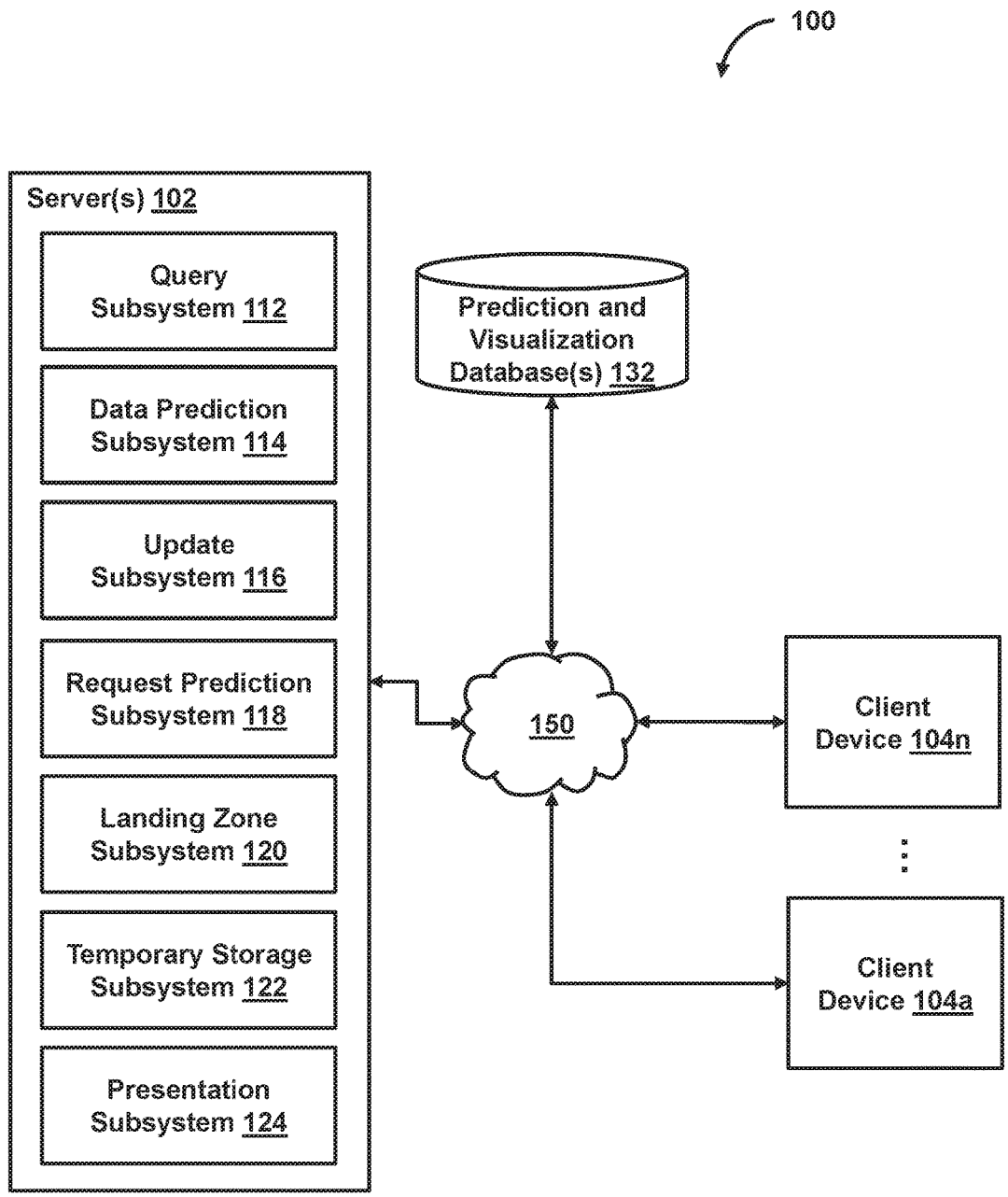
FIGS. 1A and 1B show a system for facilitating data streaming services, data visualization services, or other data access services, in accordance with one or more embodiments.

FIG. 1A shows a system 100 for facilitating data streaming services, data visualization services, or other data access services, in accordance with one or more embodiments. As shown in FIG. 1A, system 100 may include server(s) 102, client device 104 (or client devices 104a-104n), or other components. Server 102 may include query subsystem 112, data prediction subsystem 114, update subsystem 116, request prediction subsystem 118, landing zone subsystem 120, temporary storage subsystem 122, presentation subsystem 124, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100.

Figure 1B:
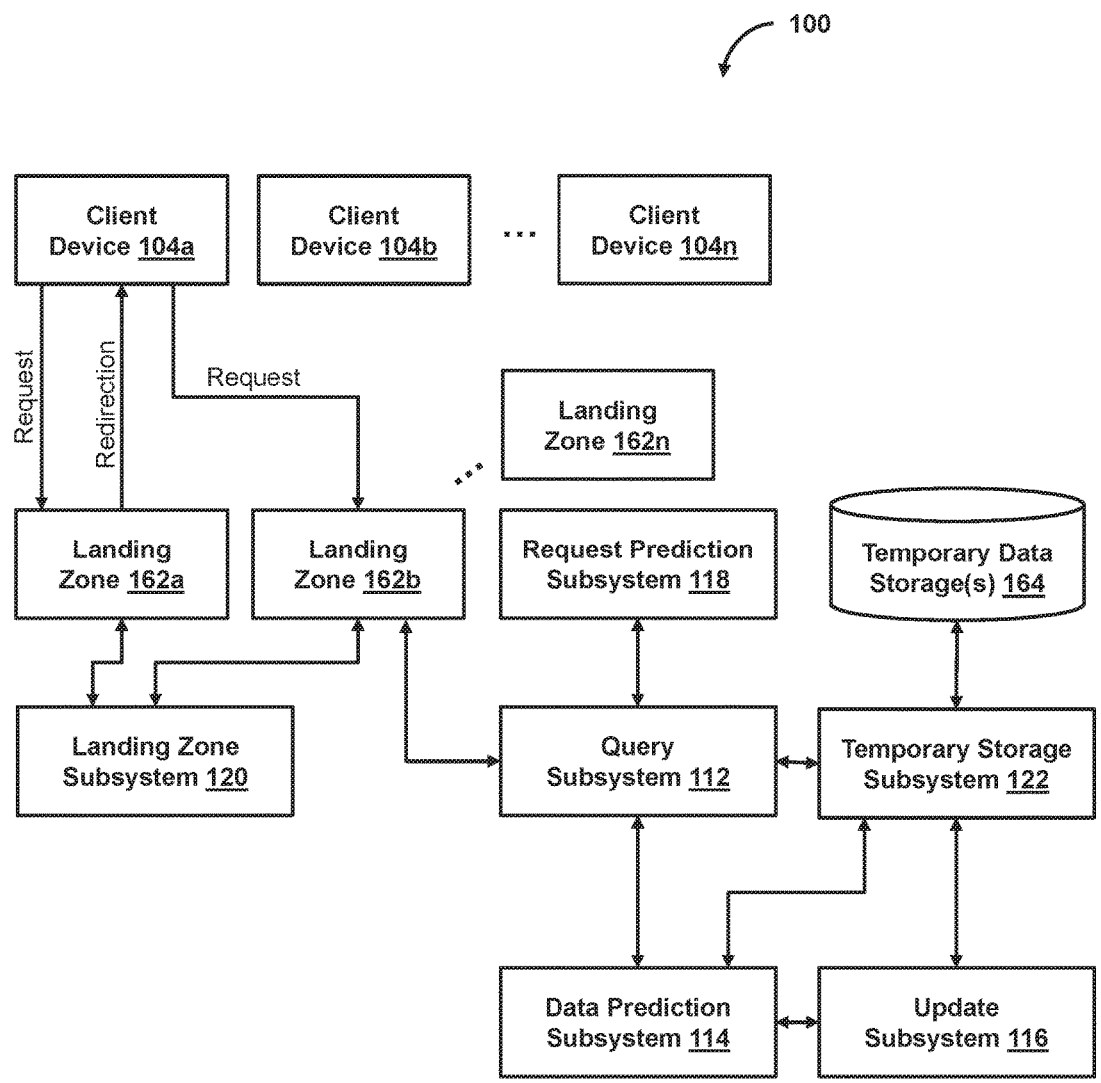

FIG. 1B shows another representation of system 100, in accordance with one or more embodiments. As shown in FIG. 1B, system 100 may further include one or more landing zones 162 (e.g., landing zones 162a-162n), temporary data storage(s) 164, or other components. It should be noted that, while one or more operations are described herein as being performed by particular components of server 102, those operations may, in some embodiments, be performed by other components of server 102 or other components of system 100. As an example, while one or more operations are described herein as being performed by components of server 102, those operations may, in some embodiments, be performed by components of client device 104.

As discussed, obtaining and/or processing data to produce a visualization of the data can be a challenge. While advances in the performance of computer hardware have greatly increased the capabilities of servers and networks to obtain and process data as well as lowered the cost to do so, the amount of data available to be obtained and processed has grown exponentially in comparison to any advances in hardware performance. Moreover, because obtaining and/or processing of such data may be time consuming, users of typical data visualization systems generally experience considerable delay before being provided with substantive information related to their requests. A number of solutions have been implemented to address one or more of the foregoing issues, including those described in U.S. patent application Ser. No. 14/634,680 (filed Feb. 27, 2015, entitled "Prioritized Retrieval and/or Processing of Data," and issued as U.S. Pat. No. 9,251,276 on Feb. 2, 2016) and U.S. patent application Ser. No. 14/698,421 (filed Apr. 28, 2015, entitled "Prioritized Execution of Plans for Obtaining and/or Processing Data," and issued as U.S. Pat. No. 9,389,909 on Jul. 12, 2016), each of which is incorporated herein by reference in its entirety.

In some embodiments, system 100 may facilitate the reduction of network resource usage, for example, via an architecture designed to provide a lower frequency of updates to a set of results stored at a given data storage corresponding to a landing zone (e.g., via which a client device obtains the updated set of results or interacts to have its requests related to the updated set of results handled) or via other techniques. As an example, predicted or other calculated values, representations of those calculated values, raw data for calculating those values, or other results (of the set of results) stored at the data storage (corresponding to the landing zone) may be updated less frequency than a frequency at which the set of results stored at another data storage is updated. In some embodiments, raw data relevant to a client-initiated query may be continuously streamed and processed to calculate updated results, and the updated results may be used to update a prior-calculated version of such results stored at a first data storage. The updated results stored at the first data storage may be used to update a prior-calculated version of such results stored at one or more other data storages (corresponding to one or more landing zones) such that the set of results stored at each of the other data storages is updated less frequently than the corresponding set of results stored at the first data storage. In this way, for example, the different frequencies at which the sets of results are updated at the respective data storages may reduce the cost of writing to a given data storage (e.g., the other data storages corresponding to a landing zone) via which such results are obtained to respond to a client request, while still allowing for the results stored on at least one data storage to be updated at a faster rate based on further data being obtained in a continuous fashion.

In some embodiments, system 100 may facilitate reduction of load at a landing zone and/or improve efficiency of request handling, for example, via dynamic assignment of one or more landing zones to handle specific requests (e.g., responsive to request predictions or other triggers), via dynamic configuration of client devices to cause the client devices to redirect their requests and related subsequent requests to the respective assigned landing zones, or via other techniques. As an example, the landing zones may be assigned to handle specific requests based on parameters of the request, such as search parameters of a query (e.g., keywords for such search, attributes for which values are sought, etc.), attributes (or their values) that are to be updated, or other request parameters. If, for example, a requested query (obtained at a first landing zone) from a client device matches one of the queries to which a second landing zone is assigned to handle (e.g., responsive to a prediction of the matching query or other triggers), the client device may be caused to redirect the query request to the second landing zone. Moreover, in some cases, the client device may additionally be caused to transmit its subsequent requests (for an update related to the requested query) to the second landing zone without first transmitting the subsequent requests to the first landing zone. As such, computer resources usage and delay may be reduced, for example, by avoiding the initial transmission of the subsequent requests to the first landing zone, avoiding additional operations needed to cause the client device to direct those subsequent requests following the initial transmission to the first landing zone, etc. In addition, because landing zones may be assigned to handle specific requests (e.g., those having a certain set of search parameters), system 100 may improve the efficiency of handling such requests in some scenarios (e.g., based on temporary storage and/or caching techniques described herein or other techniques).

In some embodiments, system 100 may facilitate reduction of delay for providing a sufficient response to a request and/or improve efficiency of temporary data storage or other computer resource usage, for example, via prediction of requests and temporary storage of query results related to the predicted requests, via selective obtainment or temporary storage of subsets of the query results related to the predicted requests, or other techniques. As an example, a request for query results may be predicted, a subset of results may be obtained responsive to the request prediction, and the subset of results may be stored at a server cache, a web cache, memory cache, or other temporary data storage. When the predicted request (or a future request matching the predicted request) does occur, the subset of results may be obtained from the temporary data storage (e.g., in lieu of having to obtain the subset of results through other data storage with significantly greater delay) and used to respond to the occurred predicted request. In one use case, the subset of results may be obtained responsive to the request prediction without obtainment of one or more other subsets of results (relevant to the predicted request) occurring from the request prediction (e.g., no queries for the other subsets of results may be executed, queries being performed may be stopped before the other subsets of results are obtained, etc.). In another use case, the subset of results may be stored at the temporary data storage without the storage of one or more other subsets of results (relevant to the predicted query) occurring from the request prediction (e.g., no caching of the other subsets of results may be triggered by the request prediction). As an example, the obtainment and/or temporary storage of the subset of results (or the lack thereof with respect to the other subsets of results) may be based on cost information, frequency information, preference information, or other information as described herein. In this way, for example, the selectiveness of the obtainment and/or temporary storage of results (prior to particular requests occurring) may significantly decrease latency or other delays for sufficiently responding to requests and improve efficiency of temporary data storage or other computer resource usage.

Prediction of Values Based on a Data Subset

In some embodiments, query subsystem 112 may obtain data related to calculating a set of values. Data prediction subsystem 114 may predict the set of values based on a subset of the related data. As an example, the set of values may be associated with one or more attributes. A request for those values may be obtained (e.g., from a client device or other device), and an initial query (or an initial set of "micro-queries") may be performed based on the request to obtain an initial subset of data related to calculating values associated with the attributes. The associated values may then be predicted based on the initial data subset. As an example, a value may be associated with one or more attributes (e.g., an object, an entity, a property, a characteristic, etc.). With respect to FIG. 2, for example, values represented by data elements 206a-206y may each be associated with at least one attribute represented in sections 202a-202e, at least one attribute represented in sections 204a-204e, and at least one attribute represented in sections 208a-208e.

In some embodiments, the predicted set of values may include approximations of what the values of the set of values would be had a complete set of data corresponding to the set of values been used to calculate the values of the set of values. In one use case, for instance, micro-query delegation may be performed to enable faster real-time results of large streaming data by performing numerous micro-queries on a distributed data store. An approximation of the final data values may be performed based on results from a subset of the micro-queries by extrapolating from the resulting data that has been processed thus far to estimate the final data values before all of the micro-queries are completed. Data elements may be generated based on the approximated data values to present users with approximated visualized information without having to wait for all of the micro-queries to be completed. In this way, among other benefits, user experience may be improved by providing users with visualized information representing final data values without having to wait for all of the results from the micro-queries to be obtained by predicting what the final data values will likely be based on results from a subset of the micro-queries that have been obtained. Upon receipt of further data from the micro-queries, an updated approximation of the final data values may be performed and then utilized to generate updated data elements to replace the previous version of the approximated data elements, thereby "sharpening" the data elements.

In some embodiments, the predicted values may be utilized to prioritize retrieval and/or processing of data related to one subset of the attributes over retrieval and/or processing of data related to other subsets of the attributes, for example, as described in U.S. patent application Ser. No. 14/634,680, filed Feb. 27, 2015 and entitled "Prioritized Retrieval and/or Processing of Data," and issued as U.S. Pat. No. 9,251,276 on Feb. 2, 2016, which is incorporated herein by reference in its entirety. In one use case, for example, priority may be assigned to a particular subset of attributes when the predicted values associated with the subset of the attributes are greater than the predicted values associated with other subsets of the attributes (e.g., if the attributes and their associated values are to be presented in descending order). In another use case, priority may be assigned to a particular subset of attributes when the predicted values associated with the subset of the attributes are less than the predicted values associated with other subsets of the attributes (e.g., if the attributes and their associated values are to be presented in ascending order). In some embodiments, an "attribute" may comprise an object, an entity, a property, a characteristic, etc., of the entity-attribute-value model (which may also be referred to as the "object-attribute-value model") or other data model. As an example, with respect to the entity-attribute-value model, a value associated with two attributes may comprise a value associated with a characteristic of an entity where the characteristic is a first attribute and the entity is a second attribute.

Presentation subsystem 124 may effectuate presentation of a data visualization user interface (e.g., at client devices 104). The data visualization user interface may be programmed to obtain user entry and/or selection of a first attribute group (associated with first attributes), a second attribute group (associated with second attributes), and/or other information. The user entry and/or selection may correspond to a request for values. The data visualization user interface may be programmed to present (predicted, updated, and/or calculated) values associated with a set of attributes (or a representation thereof) based on the request.

In some embodiments, a data visualization user interface effectuated by presentation subsystem 124 may be in the form of a pivot table (or other display style). The data visualization user interface may include rows, columns, data elements, other portions, and/or other interface elements. The rows and columns may represent respective ones of at least a first set of attributes (or first attributes) and a second set of attributes (or second attributes). Data elements may individually represent a value associated with a respective one of the first attributes and a respective one of the second attributes. For example, a data visualization user interface may include a construction of an N by M matrix where N represents a series of first attributes in rows and M represents a series of second attributes as columns. The intersection of N and M may represent the data elements representing the values associated with the first and second attributes. With respect to FIG. 2, for example, user interface 200 may be such a data visualization user interface. It is noted that the depiction of user interface 200 and accompanying descriptions are intended for illustrative purposes only. For example, in some embodiments, the procedures and/or processes described in connection with user interface 200 may instead be performed without the presentation of values to a user. Instead, for instance, predicted values may simply be stored in a database for later use, placed into a queue for further processing, etc. In some embodiments, other data visualization user interfaces (e.g., effectuated by presentation subsystem 124 or other components) may be provided.

Figure 2:
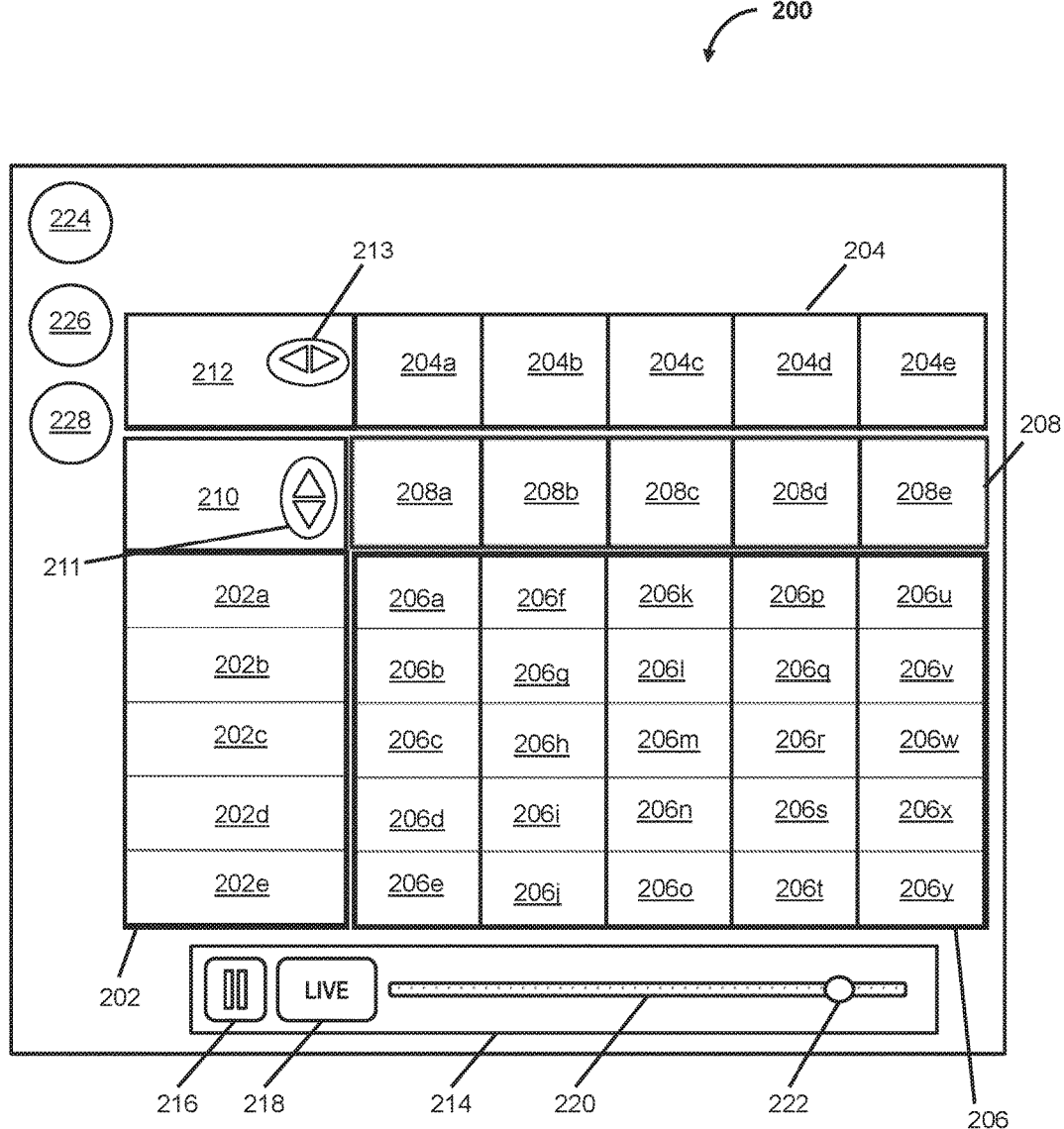
FIG. 2 illustrates a data visualization user interface, in accordance with one or more embodiments.

As an example, in FIG. 2, portion 210 may represent a first attribute group (e.g., State, Gender, Zip Code, City, Income, Product Category, or other attribute group). Portion 202 may include sections 202a-202e that may represent at least a subset of attributes (e.g., Alabama, Alaska, Arizona, and/or other states; Male, Female, or other characteristic; 92007, 92014, 92024, and/or other zip codes; 0-$25 k, $25 k-$50 k, and/or other income or range; Electronics, Books, Jewelry, Accessories, Arts, Audio, Men's, Women's, and/or other product categories; and/or other attributes) included in the first attribute group. Portion 210 may include a first control element 211. The first control element 211 may facilitate setting of a sorting preference for the attributes included in the first attribute group (e.g., thereby affecting the order in which the attributes may be presented). Sorting may be based on a description (e.g., name, numerical range, and/or other description) of respective ones of the attributes of the first attribute group, the values associated with the attributes of the first attribute group, or other criteria. For example, the first control element 211 may be used to sort the attributes of the first attributes group in ascending order based on their respective values, descending order based on their respective values, alphabetically based on the names of the first attributes, etc. As an example, the sorting may modify the subset of attributes that are displayed in sections 202a-202e.

In FIG. 2, portion 212 may represent a second attribute group (e.g., State, Gender, Zip Code, City, Income, Product Category, and/or other attribute group). Portion 204 may include sections 204a-204e that may represent a subset of attributes (e.g., Alabama, Alaska, Arizona, and/or other states; Male or Female; 92007, 92014, 92024, and/or other zip codes; $0-$25 k, $25 k-$50 k, and/or other incomes or ranges; Electronics, Books, Jewelry, Accessories, Arts, Audio, Men's, Women's, and/or other product categories; and/or other attributes) included in the second attribute group. Portion 212 may include a second control element 213. The second control element 213 may facilitate setting a sorting preference for the attributes included in the second attribute group. The sorting may, for example, affect the attributes of the second attribute group that may be included in the subset of attributes displayed in sections 204a-204e.

Portion 206 may include data elements 206a-206y that may represent at least some values associated with the attributes of the first and/or second attribute groups. The values conveyed by the data elements 206a-206y may be associated with respective ones of the attributes of the first attribute group in sections 202a-202e and respective ones of the attributes of the second attribute group in sections 204a-204e. For example, data element 206a may be associated with a first attribute in section 202a and a second attribute in section 204a.

Control elements 224, 226, and/or 228 may facilitate user modifications to user interface 200. As an example, control element 224 may correspond to configuring and/or setting the attribute groups represented by the columns and rows of the pivot table. Control element 226 may be selected to apply filters to explore other available data elements 206a-206y that may not currently be in the viewable area of portion 206, or may initiate requests for other values.

Control element 228 may be selected to change the display style for depicting the attribute groups, attributes, values, and/or other information. Display styles may comprise a pivot table, a bar chart, a bubble graph, a pie chart, a scatter plot, a word cloud, a zoomable map, and/or other display style.

Still referring to FIG. 2, portion 214 may include a pause/play button 216 for pausing or playing the data visualization, an indicator 218 specifying that the data visualization is live data, and a sliding-based control element 220 having a movable control element 222 for rewinding to visualize historical data, fast-forwarding back to visualize live data, fast-forwarding to visualize predictions of future data, etc. As shown by indicator 218, the data visualization that is depicted in portion 206 may represent live data. A user may, for example, slide movable control element 222 to the left on sliding-based control element 220 to switch the data visualization of the live data to a data visualization of historical data.

In one scenario, with respect to FIG. 2, data elements 206a-206y may represent values associated with attributes displayed in sections 202a-202e (and/or with value types displayed in section 208a-208e). The associated values may, for example, include the most up-to-date values for a certain time period thus far (e.g., a current day, week, month, year, etc.). Upon the moving of movable control element 222 toward the left along sliding-based control element 220 onto a point associated with a particular time, a request for data elements associated with the displayed attribute (with respect to the particular time and/or time period) may be initiated. As an example, responsive to the request, a historical data store may be determined and used to obtain data necessary for determining values that may be represented by the data elements 206a-206y.

Returning to FIG. 1A, based on the selection of a first and/or a second attribute group, the query subsystem 112 may perform queries for data relating to attributes of the first attribute group, attributes of the second attribute group, and/or other attributes. The queries may be performed across a plurality of data sources. The queries may be performed over one or more query intervals (e.g., based on data sources, time periods, geographic areas, etc.). As an example, responsive to a user request for a data visualization of overall sales volume of various product categories during a particular year, at least first and second sets of queries may be performed (where each set comprises one or more queries). The first and second sets of queries may be performed in series or in parallel. When data from one set of queries is obtained, the obtained data may be processed to predict the values associated with the overall sales volume of the various product categories during the requested year without having to wait for data from the other set(s) of queries to be obtained. When data from at least one remaining set of queries is obtained, this data may then be processed to update the predicted values (e.g., if not all of the queries have returned data) and/or calculate the final values associated with the overall sales volume of the various product categories during the requested year (e.g., if data from all of the queries have been obtained).

In one use case, the first set of queries may comprise one or more queries to a first subset of the relevant data sources to be searched for the requested data, and the second set of queries may comprise one or more queries to a second subset of the relevant data sources for the requested data. In another use case, the first set of queries may comprise one or more queries for such data related to one or more time periods during the requested year, and the second set of queries may comprise one or more queries for such data related to one or more other time periods during the requested year. In yet another use case, the first set of queries may comprise one or more queries for such data related to one or more geographic areas (e.g., a subset of zip codes per state, a subset of cities per state, a subset of regions per country, etc.), and the second set of queries may comprise one or more queries for such data related to one or more other geographic areas.

In some embodiments, data prediction subsystem 114 may predict values associated with a set of attributes based on a subset of data obtained via an initial query that corresponds to an initial query interval (e.g., a subset of relevant data sources, a subset of a requested time period, a subset of a requested geographic area, etc.). In one scenario, with respect to FIG. 2, a first attribute group "Product Category" may include attributes such as Books, Electronics, Jewelry, Men, Women, Toys, Pet products, and/or other attributes. A second attribute group "User Income" may include attributes such as $0 to $25,000, $25,000 to $50,000, $50,000 or more, and/or other attributes. A third attribute group "Sale Numbers" may include sales volume and/or other attributes. As an example, Table 1 below may represent predicted values associated with sale volumes (e.g., by unit), respective ones of the "Product Category" attributes (e.g., rows), and respective ones of the "User Income" attributes (e.g., columns) that may be streamed in real-time.

TABLE 1

|  | User Income | | |
| --- | --- | --- | --- |
| Product Category | $0 to $25,000 Volume | $25,000-$50,000 Volume | $50,000 or more Volume |
| Books | 107,460,342 | 107,476,521 | 71,653,491 |
| Electronics | 80,622,191 | 80,610,360 | 53,752,435 |
| Jewelry | 67,181,209 | 67,180,592 | 44,799,309 |
| Men | 26,858,564 | 26,871,587 | 17,906,847 |
| Women | 26,874,505 | 26,877,982 | 17,917,377 |

The values in Table 1 may be predicted sales volumes of the respective "Product Category" and "User Income" attributes for a certain time period (e.g., current day, week, month, year, etc.). The predicted values may represent a first prediction based on a first subset of data obtained from a first query. For example, the above values may represent a prediction of sales volumes for a 1-hour period of a given day and/or other time period. From the first prediction, it may be determined that Books, Electronics, Jewelry, Men, and Women product categories occupy the top five highest sales volumes with regard to all product categories. For example, in Table 1, the highest predicted sales volume on a product category basis for users in the income range of $0 to $25,000 is Books at 107,460,342 units. Such values may be reflected by data elements 206a-206y in the pivot table of user interface 200. The values may be updated continuously to represent the most up-to-date prediction of sales volume values for each of the attributes as more queries for data are performed.

In one use case, retrieval and/or processing of data related to one subset of the attributes over retrieval and/or processing of data related to one or more other subsets of the attributes may be performed. Prioritizing retrieval and/or processing may be based on a comparison of the predicted values with one another (e.g., based on highest-to-lowest sorting, lowest to highest sorting, and/or other considerations). With respect to FIG. 2, for example, the retrieval and/or processing of data related to the attributes in sections 202a-202e may be prioritized over attributes not included in the sections 202a-202e (e.g., the "Product Category" attributes not within the "top five" list). In the scenario of Table 1, the retrieval and/or processing of data related to Books, Electronics, Jewelry, Men, and Women may be prioritized over retrieval and/or processing of data related to Toys, Pet products, and/or other "Product Category" attributes.

Updating of Calculated Values Stored at Respective Data Storages

In some embodiments, update subsystem 116 may cause one or more calculated values to be stored on one or more data storages. Upon obtaining an updated version of a calculated value, update subsystem 116 may store the updated version of the calculated value on the data storages.

As an example, update subsystem 116 may cause the updated version of the calculated value to replace a prior version of the calculated value. In one scenario, for instance, the calculated values may include one or more predicted values that are approximations of what the values would be (had a complete set of data corresponding to the values been used to calculate the values). Update subsystem 116 may update a stored prior version of the predicted values by replacing the stored prior version with an updated version of the predicted values. In a further scenario, update subsystem 116 may continuously update the stored predicted values.

In some embodiments, update subsystem 116 may cause a calculated set of values to be stored at multiple data storages, where at least one of the data storages corresponds to a landing zone. As an example, the landing zone may be the corresponding data storage, a server (e.g., a physical server, a virtual server, etc.), an area (e.g., a web page, a node, etc.) hosted at the server, or other component via which a client device obtains data (e.g., at least some values of the calculated set of values, raw query results, or other data) or via which the client device interacts to have its requests handled. As another example, the data storages may be server data storages, such as areas on one or more hard drives or other electronic storages (e.g., server cache, web cache, other temporary data storage, or other storage) hosted at a server, databases associated with a server, or other server data storages. The server data storages may be associated with the same server or different servers. It should be noted that, although some embodiments are described herein with respect to predicted values stored at multiple data storages and/or the updating of those predicted values stored at the respective data storages, it is understood that other types of calculated values (e.g., values calculated based on complete sets of data corresponding to the respective values) may be stored at the multiple data storages and updating of the other types of calculated values (stored at the respective data storages) may be performed via various techniques described herein with respect to predicted values.

In some embodiments, upon obtaining a subset of data related to calculating a set of values, the set of values may be predicted based on the subset of the related data and stored on a first data storage and a second data storage, where at least the second data storage corresponds to a landing zone via which a client device obtains data (e.g., at least some values of the predicted set of values, raw query results, or other data) or via which the client device interacts to have its requests handled. Update subsystem 116 may update the predicted set of values (stored at the first data storage) based on further subsets of the related data. As an example, update subsystem 116 may continuously update the predicted set of values (stored at the first data storage) based on the further subsets of the related data during a given time period such that the predicted set of values (stored at the first data storage) is updated at least a first number of times within the time period. In one use case, for instance, the continuous updating during the time period may include periodically updating the predicted set of values (stored at the first data storage during the time period). In another use case, the continuous updating (during the time period) may include updating the predicted set of values (stored at the first data storage) in real-time during the time period as the further subsets of the related data are being obtained.

In some embodiments, update subsystem 116 may update the predicted set of values (stored at the second data storage corresponding to a landing zone) based on the predicted set of values stored at the first data storage. As an example, update subsystem 116 may continuously update the predicted set of values (stored at the second data storage) such that the predicted set of values (stored at the second data storage) is updated less than the first number of times (that the predicted set of values stored at the first data storage is updated) within the time period. In some embodiments, the continuous updating of the predicted set of values stored at the second data storage may include periodically transmitting a version of the predicted set of values stored at the first data storage to the second data storage (e.g., every 5 seconds, every minute, or other rate) to replace a version of the predicted set of values stored at the second data storage. Each of the periodically transmitted versions may, for instance, be more recently updated than the respective replaced version of the predicted set of values stored at the second data storage.

In one use case, for example, approximations of the overall jewelry sales (in the United States for a given year) may be obtained from the second data storage (to which a landing zone for a client device corresponds) and provided to the client device to respond to the client device's request for the overall jewelry sales. Although data relevant to the overall jewelry sales (in the United States for a given year) may be continuously streamed and processed to calculate updated approximations of the actual overall jewelry sales every second (or based on another time interval), the approximations stored at the second data storage may only be updated with the most recent updated approximations every five seconds (or based on another other time interval greater than the frequency in which the approximations available from another data storage, such as the first data storage, are updated). In this way, for example, the different frequencies at which the approximations are updated at the respective data storages may reduce the cost of writing to a given data storage (e.g., the second data storage) from which the approximations are obtained to respond to a client request, while still allowing for the approximations to be updated and stored (on another component such as the first data storage) at a faster rate. As an example, if the cost of each write to the first data storage for each set of approximations is one unit, and the cost of each write to the second data storage for each set of approximations is 100 units (e.g., in monetary or computer resources costs), then the cost savings of updating each set of approximations at the second data storage every five seconds (as opposed to every second) is about 7 million units per day (i.e., 24 hours/day*60 minutes/hour*60 seconds/minute*(4/5 in savings for each update)*100 units). As another example, when this cost savings is extrapolated out to 20,000 different requested sets of approximations, the cost savings is about 140 billion units per day (or about 50 trillion units per year).

In some embodiments, update subsystem 116 may determine an update rate for updating a predicted set of values stored at a given data storage. In some embodiments, the update rate may be based on cost information, such as information indicating one or more costs associated with writing to the data storage or other information. As an example, an update rate for updating the predicted set of values stored at a first data storage may be a first update rate, and an update rate for updating the predicted set of values stored at a second data storage (e.g., to which a landing zone for client requests may correspond) may be a second update rate. In one scenario, the first update rate may be determined (as an update rate for updating the predicted set of values to the first data storage) based on the costs associated with writing to the first data storage. In another scenario, the second update rate may be determined (as an update rate for updating the predicted set of values to the second data storage) based on the costs associated with writing to the second data storage. Such associated costs may, for instance, comprise a monetary cost for writing to the respective data storage, a computer resource cost for writing to the respective data storage (e.g., bandwidth or other network resource usage amount or other computer resource cost), or other costs.

In some embodiments, landing zone subsystem 120 may obtain compatibility information associated with a client device. Landing zone subsystem 120 may select, based on the compatibility information, a given data storage from a plurality of data storages is a data storage for storage of versions of calculated values requested by the client device. As an example, a predicted set of values stored at a first data storage may be continuously updated at a first update rate, and the predicted set of value stored at a second data storage may be continuously updated at a second update rate. Landing zone subsystem 120 may select the second data storage as a data storage for storing the predicted set of values based on compatibility information associated with the client device (requesting the set of values) indicating that the client device is compatible with the second data storage. In one scenario, for instance, the compatibility information may comprise information indicating one or more database management systems with which the client device is compatible or other information. The second data storage may be selected (for storage of versions of the predicted set of values) based on a determination that the second data storage uses at least one of the compatible database management systems (indicated by the compatibility information).

Landing Zone Assignments

In some embodiments, one or more landing zones may be assigned to handle requests, such as a query (or a submission of such query), an update request related to the query, a request to perform one or more other actions (e.g., send a message, upload or publish content, etc.), or other request. A landing zone may, for instance, include a data storage (e.g., a database or other data storage), a server (e.g., a physical server, a virtual server, etc.), an area (e.g., a web page, a node, etc.) hosted at the server, or other component via which a client device obtains data or interacts to have its requests handled. As an example, the landing zones may be assigned based on geographic region, carrier (e.g., Internet Service Providers or other carriers), device type (e.g., mobile devices, iOS devices, Android devices, or other device types), IP address, MAC address, or other criteria. As another example, the landing zones may be assigned to handle specific requests based on parameters of the requests, such as search parameters of a query (e.g., keywords for such search, attributes for which values are sought, etc.), attributes (or their values) that are to be updated, or other request parameters.

In some embodiments, a client device may be caused to redirect a request (that the client device initially provided to one landing zone) to another landing zone based on geographic region, carrier, device type, IP address, MAC address, or other criteria. As an example, if a request originating from a particular geographic region is obtained at one landing zone, a client device (from which the request was obtained) may be redirected to another landing zone assigned to handle requests originating from the geographic region. As another example, if a request originating from a client device (associated with a particular carrier) is obtained at one landing zone, the client device may be redirected to another landing zone assigned to handle requests originating from client devices associated with the carrier. As another example, if a request originating from a client device (of a particular device type) is obtained at one landing zone, the client device may be redirected to another landing zone assigned to handle requests originating from client devices of the device type. As another example, if a request originating from a client device associated with an address (e.g., IP address, MAC address, etc., with a particular address range) is obtained at one landing zone, the client device may be redirected to another landing zone assigned to handle requests originating from client devices associated with addresses having the address range. As yet another example, if a request with a particular set of request parameters is obtained at one landing zone, the client device may be redirected to another landing zone assigned to handle requests with the same or similar sets of request parameters.

In some embodiments, a landing zone may be assigned to handle one or more specific predicted requests (or requests that are the same or similar to such predicted requests). In some embodiments, request prediction subsystem 118 may predict a request related to a client-initiated query prior to the query-related request being obtained from a client device at a first landing zone. Landing zone subsystem 120 may assign one or more other landing zones to handle responding to the query-related request such that, when the query-related request is obtained from the client device at the first landing zone, the client device may be caused to redirect the query-related request to at least one of the other landing zones. As an example, the query-related request may comprise a query submission related to the client-initiated query, an update request related to the client-initiated query, or other request. In some embodiments, the first landing zone may be a default landing zone, and the other landing zones may each be a query-specific landing zone. In this way, for example, system 100 may reduce the load on a given landing zone by assigning other landing zones to handle respective sets of requests and causing client devices to redirect their requests (that they initially transmitted to the given landing zone) to the other landing zones respectively assigned to handle their requests. For example, with respect to the "micro-queries" and "data sharpening" context described herein, a single client device may initiate (for each client-initiated query) numerous requests to a landing zone for new updates to approximated results. If, for instance, the client device initiates a request every five seconds, this would be over 17,000 requests obtained from the client device alone per day. When thousands of client devices (or hundreds of thousands or millions of client devices) are each initiating numerous requests to a single landing zone, the landing zone may become overloaded and unable to handle those requests. Thus, the assignment of other landing zones to handle respective requests and the redirection based thereon may avoid the overloading of any given landing zone (e.g., a default landing zone or other landing zone). In addition, because landing zones may be assigned to handle specific requests (e.g., those having a certain set of search parameters), system 100 may improve the efficiency of handling such requests in some scenarios (e.g., based on temporary storage and/or caching techniques described herein or other techniques).

In some embodiments, request prediction subsystem 118 may determine request history information comprising information indicating one or more prior queries, information indicating respective frequencies of requests (e.g., a frequency of each of the prior queries, update requests related to the prior queries, etc.), information regarding users or client devices that initiated prior requests, or other information. Request prediction subsystem 118 may predict one or more requests to occur in the future based on the request history information (e.g., the prior query indications, the frequency indications, the user and/or client device information, etc.).

As an example, based on obtaining an initial query submission from a client device, request prediction subsystem 118 may determine that it is likely that an update request related to the initial query submission will be obtained (e.g., from the client device or other component). In one use case, with respect to applications configured for "data sharpening" based on micro-queries, an approximation of the final data values (relevant to the client query) may be performed based on results from a subset of the micro-queries by extrapolating from the resulting data that has been processed thus far to estimate the final data values before all of the micro-queries are completed. Data elements may be generated based on the approximated data values to present users with approximated visualized information without having to wait for all of the micro-queries to be completed. If such applications are configured to automatically update the generated data elements based on an updated approximation of the final data values (e.g., to "sharpen" the data visualization when further data from the micro-queries are obtained), request prediction subsystem 118 may predict that the update request (related to the initial query submission) will be obtained in the near future (e.g., based on the known frequencies of such updates or other information).

As another example, a request including one or more parameters may be predicted to occur in the future based on the frequency of prior requests that include those parameters. The request parameters may include search parameters of a query (e.g., keywords for such search, attributes for which values are sought, etc.), attributes (or their values) that are to be updated, or other request parameters. In one use case, requests that include search parameters A, B, and C (e.g., requests with search parameters A, B, and C as well as other search parameters, where A, B, and C are "women's watches," "year to date," "United States," or other search parameters) may occur at a frequency rate that satisfies a certainty threshold indicating a high likelihood of such a request occurring again within a predetermined time period (e.g., in next the few seconds, in the next few minutes, in the next few hours, or other predetermined time period). Based on this frequency rate, request prediction subsystem 118 may predict that a request including the search parameters A, B, and C will occur within the predetermined time period.

In some embodiments, subsequent to a request related to a client-initiated query being predicted and a second landing zone being assigned to handle such predicted request, the query-related request may be obtained at a first landing zone from a client device. Based on the assignment to the second landing zone, landing zone subsystem 120 may cause the client device to redirect the query-related request to the second landing zone such that the client device transmits the query-related request, subsequent requests (for an update related to the client-initiated query), or further requests to the second landing zone without first transmitting the subsequent requests or the further requests to the first landing zone. In some embodiments, landing zone subsystem 120 may provide a redirection instruction, a reference associated with the second landing zone (e.g., an identifier or address associated with the second landing zone), or other information to the client device. The providing of such information causes the client device to transmit the query-related request, the subsequent requests, or the further requests to the second landing zone without first transmitting the subsequent requests or the further requests to the first landing zone. As an example, responsive to being provided the redirection instruction and the second landing zone reference, the client device may process the redirection instruction and use the second landing zone reference to transmit the query-related request and the subsequent requests to the second landing zone (e.g., without first transmitting the subsequent requests to the first landing zone). As another example, the processing of the redirection instruction may cause the client device to modify one or more of its configuration settings such that the client device transmits the query-related request and the subsequent requests to the second landing zone without first transmitting the subsequent requests to the first landing zone.

In one scenario, with respect to FIG. 1B, responsive to a prediction that a request will occur in the future, landing zone 162b may be assigned to handle requests matching the predicted request. As indicated in FIG. 1B, landing zone 162a may obtain a request from client device 104a. If, for example, landing zone subsystem 120 determines that the obtained request matches the predicted request, landing zone subsystem 120 may provide client device 104a with a redirection instruction and an address associated with landing zone 162b, where the redirection instruction indicates that client device 104a should redirect its request to landing zone 162b using the associated address. Based on the redirection instruction and the associated address, client device 104a may redirect its request to landing zone 162b. In a further scenario, the redirection instruction may indicate to client device 104a that it should transmit subsequent requests related to its redirected request (e.g., subsequent update requests or other requests) to landing zone 162b without first transmitting the subsequent requests to landing zone 162a. The processing of the redirection instruction may, for instance, cause client device 104a to modify one or more of its configuration settings such that client device 104a transmits its request and the related further requests to landing zone 162b without first transmitting the related further requests to landing zone 162a.

In another scenario, where the redirected request of client device 104a is a first client-initiated query, landing zone 162a may obtain a subsequent request related to a second client-initiated query. If, for example, landing zone subsystem 120 determines that the obtained subsequent request (related to the second client-initiated query) matches the earlier predicted request, landing zone subsystem 120 may provide client device 104a with a redirection instruction and the address associated with landing zone 162b, where the redirection instruction indicates that client device 104a should redirect its request to landing zone 162b using the associated address. Based on the redirection instruction in the associated address client device 104a may redirect its request to landing zone 162b. In a further scenario, the redirection instruction may indicate to client device 104a that it should transmit further requests related to the redirected request (related to the second client-initiated query) to landing zone 162b without first transmitting the further requests to landing zone 162a.

In another scenario, landing zone 162a may obtain a request from client device 104b. If, for example, landing zone subsystem 120 determines that the request (obtained from client device 104b) matches the earlier predicted request, landing zone subsystem 120 may also provide client device 104b with a redirection instruction and the address associated with landing zone 162b where the redirection address indicates that client device 104b should redirect its request to landing zone 162b using the associated address. Like client device 104a, client device 104b may redirect its request to landing zone 162b based on the redirection instruction in the associated address. In a further scenario, like with client device 104a, the redirection instruction may indicate to client device 104b that it should transmit subsequent requests relating to its redirected request to landing zone 162b without first transmitting the subsequent requests to landing zone 162a.

In yet another scenario, if landing zone 162a obtains a request from client device 104a, and landing zone subsystem 120 determines that the request (obtained from client device 104a) does not match any earlier predicted request (assigned to some landing zone to handle), landing zone subsystem 120 may not provide a redirection instruction to client device 104a to cause client device 104a to redirect its request to another landing zone. As an example, if the parameters of the obtained request do not match any of the respective sets of request parameters assigned to another landing zone to handle, no redirection instruction may be provided to client device 104 to cause client device 104 to redirect its request to another landing zone. As a further example, the search parameters of the obtained request do not include at least one predefined set of search parameters assigned to another landing zone to handle, no redirection instruction may be provided to client device 104 to cause client device 104 to redirect its request to another landing zone.

In some embodiments, multiple requests may be predicted to occur in the future, and each of the requests may subsequently be obtained at a first landing zone (e.g., landing zone 162a). A second landing zone (e.g., landing zone 162b) may be assigned to handle responding to one of the predicted requests, a third landing zone (e.g., landing zone 162n) may be assigned to handle responding to another one of the predicted requests, and so on. In one use case, when a given query request is obtained at the first landing zone from a first client device (e.g., client device 104a), landing zone subsystem 120 may determine that the query request matches a predicted request for which the second landing zone is assigned to handle. Responsive to such determination, landing zone subsystem 120 may cause the first client device to redirect its query request, subsequent requests for an update related to the requested query, or other requests related to the requested query to the second landing zone. As an example, landing zone subsystem 120 may cause the first client device to transmit the query request, the subsequent requests, or the other requests to second landing zone without first transmitting the subsequent requests or the other requests to the first landing zone.

In a further use case, when another query request is obtained at the first landing zone from a client device (e.g., client device 104a, client device 104b, etc.), landing zone subsystem 120 may determine that the query request matches a predicted request for which the third landing zone is assigned to handle. Responsive to such determination, landing zone subsystem 120 may cause the client device to redirect this other query request, subsequent requests for an update related to the other requested query, or other requests related to the other requested query to the third landing zone. As an example, landing zone subsystem 120 may cause the client device to transmit the other query request, the subsequent requests (for an update related to the other requested query), or the other requests (related to the other requested query) to third landing zone without first transmitting the subsequent requests or the other request to the third landing zone.

Request-Prediction-Based Temporary Storage of Query Results

In some embodiments, based on a prediction that a given request (or requests similar to the predicted request) will occur in the future, one or more actions may be initiated to prepare for the predicted request or handle the predicted request prior to such request occurring in the future.

As an example, with respect to a prediction of a client request for query results, the request may comprise a query submission (or a client-initiated query), an update request related to the client-initiated query, or other request. The request prediction may, for instance, be based on request history information, such as information indicating one or more prior queries, information indicating respective frequencies of requests (e.g., a frequency of each of the prior queries, update requests related to the prior queries, etc.), information regarding users or client devices that initiated prior requests, or other information. In one scenario, at least some of the requested query results may be obtained based on the request prediction prior to the request being obtained from a client device in the future. The obtained query results may be stored (e.g., in a temporary data storage, such as a server cache, a web cache, memory cache, or other temporary data storage) in anticipation of the request occurring in the future so that the stored query results can be utilized to respond to the future request upon its occurrence.

In some embodiments, request prediction subsystem 118 may predict a request for query results, query subsystem 112 may obtain a subset of results responsive to the request prediction, and temporary storage subsystem 122 may cause the subset of results to be stored in a temporary data storage. As an example, the subset of results may be a portion of a set of results that would have been obtained to respond to the request had the request been obtained from a client device. In one use case, for instance, if the set of results are all the results that would have been provided on a first web page (e.g., a list of the most relevant results or other presentation) returned to the client device (as a response to the request), the subset of results may be a portion of those results provided on the first web page. In another use case, the set of results may be all the results that would have been obtained to respond to the request had the request been obtained from the client device.

In some embodiments, the set of results (including the subset of results and other subsets of results) may be stored in the temporary data storage. In some embodiments, temporary storage subsystem 122 may cause the subset of results to be stored in the temporary data storage responsive to the request prediction, and no storage of other subsets of the set of results in the temporary data storage occurs from the request prediction. As an example, no performance of queries for the other subsets (of the set of results) may occur from the request prediction. As another example, the performance of queries (via which the subset of results is obtained) may be stopped before the other subsets (of the set of results) are obtained. As yet another example, even if the other subsets are obtained (e.g., via one or more queries responsive to the request prediction), a determination may be made not to store the other subsets (of the set of results) in the temporary data storage.

In some embodiments, the obtainment and/or storage of the subset of results (and/or the determination not to obtain or store the other subsets of results) may be based on frequency information, cost information, preference information, or other information. In some embodiments, the queries that are performed (via which the subset of results is obtained) responsive to the request prediction may be a subset of a set of queries that would have been performed to respond to the request had the request been obtained from a client device. These performed queries may be selected to be performed over one or more other queries (of the set of queries) such that no performance of the other queries occurs from the request prediction. Query subsystem may perform the selection of the subset of queries to be performed (over the other queries) based on the frequency information, the cost information, the preference information, or other information. The frequency information may comprise information indicating a frequency of requests matching the request or other information. The cost information may comprise information indicating costs for storing data in the temporary data storage, information indicating costs for performing respective queries, or other information. Such costs may, for instance, comprise a monetary cost, a computer resource cost (e.g., bandwidth or other network resource usage amount or other computer resource cost), or other costs. The preference information may comprise information indicating one or more preferences related to a manner in which to present data or other information. The preferences (related to a manner in which to present data) may comprise a preference for a sorting order for presenting data, a preference for an amount of data to be presented at a given time, a preference for a format in which to present data, or other preferences.

A cost/benefit analysis may, for instance, be performed to determine which and/or the amount of results to be obtained and/or stored responsive to the request prediction. In one use case, query subsystem 112 may determine whether to perform queries (and/or which queries to perform) based on their respective costs (e.g., a cost to query a data source for data), the respective benefits of results obtained from those queries (e.g., a frequency of requests matching the predicted request, which of the results have priority over other results based on a requester's preference information, etc.), the respective costs for storing those results at the temporary data storage, or other criteria. In a further use case, scores may be assigned to respective queries (before they are executed) based on their respective costs, the respective benefits of results obtained from those queries, the respective costs for storing those results at the temporary data storage, or other criteria. As an example, a lower cost to query a data source for data may influence a higher assigned score for a corresponding query (compare to scores for other queries). A greater frequency of requests matching the predicted request may influence higher assigned scores for the queries related to the predicted request. A greater likelihood that results derived from one query will be presented to a requester (e.g., on a user interface over other results derived from other queries based on the requester's preferences) may influence a higher score for the query (compare to scores for the other queries). Based on their respective assigned scores, query subsystem 112 may determine whether and/or which of one or more of the queries are to be performed. As an example, query subsystem 112 may select a subset of the queries to be performed based on the subset of queries having greater scores than the other subsets of queries.

In another use case, even if obtained, temporary storage subsystem 122 may determine whether to store results (and/or the amount of results to be stored) based on the respective costs for storing those results at the temporary data storage, the respective benefits of those results, or other criteria. In a further use case, scores may be assigned to respective results (e.g., subsets of results) based on the respective costs for storing those results at the temporary data storage, the respective benefits of those results, or other criteria. As an example, a lower cost to store certain subsets of results may influence higher assigned scores for the subset of results. A greater frequency of requests matching the predicted request may influence higher assigned scores for the results related to the predicted request. A greater likelihood that certain subsets of results will be presented to a requester (e.g., on a user interface over other results based on the requester's preferences) may influence a higher score for the subsets of results. Based on their respective assigned scores, temporary storage subsystem 122 may determine whether and/or which of the results are to be stored at the temporary data storage. Temporary storage subsystem 122 may, for instance, select a subset of the results (e.g., obtained from the performed queries) to be stored based on the subset of results having greater scores than the other subsets of results.

As indicated, in some embodiments, a determination of which and/or the amount of results to be obtained and/or stored (responsive to a prediction of a request) may be based on preference information indicating one or more preferences related to a manner in which to present data or other information. The preferences may be inferred based on one or more prior actions with respect to the manner in which to present data, explicitly defined by a customer with respect to the manner in which data is to be presented for that customer, etc.

As an example, Table 1 above may represent calculated values associated with sale volumes (e.g., by unit), respective ones of the "Product Category" attributes (e.g., rows), and respective ones of the "User Income" attributes (e.g., columns) that are first presented at a client device (e.g., prior to other values associated with the foregoing attributes or other attributes) responsive to the client device's request for values associated with the foregoing attributes. The manner in which the values and their attributes are presented may reflect a predetermined sorting order for presenting data (e.g., highest to lowest), an amount of data to be presented at a given top (e.g., the top five values for the respective attributes), a format in which to present the data, or other manner in which to present the data.

In one scenario, if the manner in which the data is presented in Table 1 reflects the most likely manner in which a given customer will view a request for the values associated with the foregoing attributes (shown in Table 1), then more weight may be given to certain queries (from which values that will first be presented at a client device prior to other values associated with the foregoing attributes or other attributes) over other queries when determining whether and/or which queries are to be performed to obtain results relevant to a predicted request (for values associated with the foregoing attributes). Similarly, in another scenario, more weight may be given to the values that will first be presented at a client device (or data for calculating such values) over other values (or other data for calculating such other values) when determining whether and/or which results are to be stored in a temporary data storage in anticipation of the predicted request occurring in the future so that the stored results can be utilized to respond to the future request upon its occurrence. In this way, for example, the values likely to be presented first (before other values are to be presented) may quickly be provided without the delays typically associated with having to wait until those values (to be presented first) are obtained via queries to one or more other data sources. If, for instance, data for calculating such values are stored in a temporary data storage that enables faster data retrieval (e.g., where the temporary data storage is a server cache, web cache, memory cache, or other temporary data storage that enables faster data retrieval, in comparison to obtaining data from the other data sources), such data may be quickly obtained and processed to calculate such values, which may then be provided to respond to the request. If the calculated values are stored in such temporary data storage, the calculated values may be obtained and then provided to respond to the request.

In some embodiments, although results may be obtained and/or stored responsive to a prediction of one or more requests (as described herein), no results may be obtained and/or stored responsive to a prediction of certain other requests (e.g., even if the probabilities of those other requests occurring each satisfies a certainty threshold). As an example, query subsystem 112 may determine not to perform any queries responsive to a prediction of a request based on a cost/benefit analysis performed with respect to the predicted request (e.g., based on frequency information, cost information, preference information, or other information). As another example, temporary storage subsystem 122 may determine not to store any results obtained from the request prediction based on a cost/benefit analysis performed with respect to the predicted request (e.g., based on frequency information, cost information, preference information, or other information).

Request-Prediction-Based Temporary Storage of Predicted Values

In some embodiments, where a subset of results (obtained responsive to a prediction of a request) comprises a predicted set of values, query subsystem 112 may perform queries for data related to calculating a set of values (of which the subset of values is a part) responsive to the request prediction. Query subsystem 112 may obtain a subset of the related data (for calculating the set of values) based on the performed queries. Data prediction subsystem 114 may predict the set of values based on the subset of the related data (e.g., without using other subsets of the related data). Temporary storage subsystem 122 may cause the predicted set of values to be stored in a temporary data storage (e.g., a server cache, a web cache, memory cache, or other temporary data storage) in anticipation of a future request for the set of values (or approximation thereof). Upon obtaining the request (e.g., a request matching the predicted request) from a client device, query subsystem 112 may process the request and determine that at least some results satisfying the request are already stored in the temporary data storage (e.g., in the form of the stored predicted set of values). As such, query subsystem 112 may obtain the predicted values from the temporary data storage based on the request from the client device. Presentation subsystem may then provide the predicted set of values for presentation at the client device. As an example, the predicted set of values may be provided to the client device, which may generate a data visualization based on the provided predicted set of values. As another example, presentation subsystem 124 may generate a data visualization comprising representations of the predicted set of values and provide the data visualization at the client device.

In some embodiments, query subsystem 112 may cause the performance of the queries to stop prior to obtaining the other subsets of the related data. The performance of the queries may be stopped after at least the subset of the related data is obtained. Data prediction subsystem 114 may thus predict the set of values based on the subset of the related data without the other subsets of the related data. Temporary data storage subsystem 112 may store this predicted set of values (which are predicted without use of the other subsets of the related data) in the temporary data storage in anticipation of a future request for the set of values (or approximation thereof). As indicated, in some embodiments, the performance of the queries may be caused to stop (prior to obtaining the other subsets of the related data) based on frequency information, cost information, preference information, or other information.

As an example, query subsystem 112 may determine whether an amount of data obtained from the performance of the queries satisfies a predetermined amount threshold. If the obtained amount of data does not satisfy the predetermined amount threshold, query subsystem 112 may continue the performance of the queries to obtain additional data. If the obtained amount of data satisfies the predetermined amount threshold, query subsystem may stop the performance of the queries (e.g., so that computer resources saved from the stopping of the performance of the queries may be utilized to handle other tasks, such as performing queries related to other predicted requests, responding to client requests, etc.). In one scenario, query subsystem 112 may determine the predetermined amount threshold based on the frequency information, the cost information, the preference information, or other information. For example, a greater frequency of requests matching the predicted request may influence a greater amount threshold (e.g., so that more data may be obtained to provide more accurate value prediction given the likely higher number of requests for the predicted values or the higher number of customers to which the predicted values will likely be presented). A lower cost to continue to query a data source for data (e.g., monetary or computer resource cost) may influence a greater amount of threshold.

As another example, multiple predetermined amount thresholds may be utilized to determine whether to stop the performance of the queries, where a first predetermined threshold may be used to determine whether to stop the performance of a first subset of the queries, a second predetermined threshold may be used to determine whether to stop the performance of a second subset of queries, and so on. In one use case, a greater likelihood that certain results derived from one query will be presented to a requester (e.g., on a user interface over other results derived from other queries based on the requester's preferences) may influence a higher amount threshold to be used to determine whether to stop the query (compare to amount thresholds to be used to determine whether to stop other queries). For example, if the manner in which the data is presented in Table 1 above reflects the most likely manner in which a given customer will view a request for the values associated with the foregoing attributes (shown in Table 1), then a higher amount threshold may be given to certain queries (from which values that will first be presented at a client device prior to other values associated with the foregoing attributes or other attributes) over other queries for use in determining when to stop the performance of the queries. In this way, for example, more data may be obtained to predict the values that will likely be presented first (e.g., the top five highest sales volumes) to facilitate more accurate prediction for those values. By quickly providing the presentation of the more accurate predicted values, it may appear to the requester that there is minimal delay from the time of a client request being initiated at a client device and the time at which the presentation of the "final" values are provided at the client device (e.g., if the predicted values are the same or similar to the actual final values when those final values are calculated).

In some embodiments, upon obtaining a request (e.g., a request matching a predicted request) from a client device, query subsystem 112 may process the request and determine that a predicted set of values satisfying the request are already stored in a temporary data storage. Query subsystem 112 may obtain the predicted set of values from the temporary data storage, and presentation subsystem 124 may provide the predicted set of values for presentation at the client device. Query subsystem 112 may also obtain data related to calculating the predicted set of values from one or more other data sources, and data prediction subsystem 114 may generate an updated predicted set of values based on the obtained related data. As an example, the predicted set of values obtained from the temporary data storage may have been predicted based on a subset of the related data without one or more other subsets of the related data. The updated predicted set of values, however, may be based on additional or alternative subsets of the related data (e.g., based on the subset of the related data and the other subsets of the related data, based on the other subsets of the related data without the subset of the related data, etc.). Upon the updated prediction, presentation subsystem 124 may provide the updated predicted set of values for presentation at the client device. As an example, the updated predicted set of values may be provided to the client device, which may generate a data visualization based on the provided predicted set of values. As another example, presentation subsystem 124 may generate a data visualization comprising representations of the updated predicted set of values and provide the data visualization at the client device.

Presentation of Temporarily-Stored Results and Updating Thereof

As discussed, in some embodiments, based on a request obtained from a client device, query subsystem 112 may obtain one or more results from one or more data sources (e.g., local temporary data storage, other local data sources, external data sources, etc.). Presentation subsystem 124 may provide a presentation at the client device based on the obtained results. As an example, the obtained results may be provided to the client device, which may generate a data visualization based on the provided results. As another example, presentation subsystem 124 may generate a data visualization comprising representations of the obtained results and provide the data visualization at the client device.

In some embodiments, where a subset of results (relevant to a request from a client device) is stored in a temporary data storage, query subsystem 112 may obtain the subset of results from the temporary data storage responsive to the request from the client device. If one or more other subsets of results (relevant to the request) are not stored in the temporary data storage, query subsystem 112 may obtain the other subsets of results via one or more other data sources. Presentation subsystem 124 may provide a presentation at the client device based on the subset of results and the other subset of results. In some embodiments, presentation subsystem 124 may provide a presentation at the client device based on the subset of results prior to completing the obtainment of the other subsets of results from the other data sources. Upon obtaining the other subsets of results, update subsystem 116 may direct presentation subsystem 124 to update the presentation at the client device based on the subset of results, the other subsets of results, or other results. In this way, for example, a presentation related to the client request may quickly be provided based on the temporarily-stored subset of results, for example, in scenarios which the temporary data storage (from which the subset of results are obtained) enable faster data retrieval (e.g., where the temporary data storage is a server cache, web cache, memory cache, or other temporary data storage enables faster data retrieval, in comparison to obtaining data from the other data sources). As such, for instance, the user experience of the requester (that initiated the request at the client device) may be improved given that the requestor need not experience the delays typically associated with having to wait until one or more of the other subsets of the related data are obtained from the other data sources and/or processed.

In some embodiments, where a subset of data (related to calculating a set of values requested by a client device) is stored on a temporary data storage, query subsystem 112 may obtain the subset of the related data from the temporary data storage responsive to the request from the client device. Data prediction subsystem 114 may predict the set of values at a first time based on the subset of related data (obtained from the temporary data storage). As an example, data prediction subsystem 114 may extrapolate from the subset of the related data (that has been processed thus far) to estimate the final values (of the set of values) prior to the other subsets of the related data being obtained and/or processed. Presentation subsystem 124 may provide a presentation of the predicted set of values (that was predicted at the first time) at the client device prior to the other subsets of the related data being obtained and/or processed. At a second time (subsequent to the first time and after the other subsets of the related data is obtained), update subsystem 116 may direct data prediction subsystem 114 to update the predicted set of values based on the subset of the related data, the other subsets of the related data, or other data. Update subsystem 116 may direct presentation subsystem 116 to update the presentation of the predicted set of values with a presentation of the updated presented set of values (that was updated at the second time). Thus, the requester may be quickly provided with an approximation of what the requested final values are without the delays typically associated with having to wait until one or more of the other subsets of the related data are obtained from the other data sources and/or processed. Moreover, given that the predicted set of values (predicted without the other subsets of the related data) may reflect the final values (or close to the final values), quickly providing the presentation with the initially predicted set of values may provide the requester with the appearance of minimal delay from the time of the client request being initiated at the client device and the time at which the presentation of the "final" values are provided at the client device.

In some embodiments, where a predicted set of values (that are approximations of a set of values requested by a client device) is stored on a temporary data storage, query subsystem 112 may obtain the predicted set of values from the temporary data storage responsive to the request from the client device. Presentation subsystem 124 may provide the predicted set of value for presentation at the client device. In some embodiments, where the predicted set of values (obtained from the temporary data storage) was predicted based on a subset of data (related to calculating the set of values) without one or more other subsets of the related data, and where the other subsets of the related data are not stored on the temporary data storage, query subsystem 112 may perform queries to one or more other data sources to obtain the other subsets of the related data. Update subsystem 116 may direct data prediction subsystem 114 to update the predicted set of values based on the subset of the related data, the other subsets of the related data, or other data. Update subsystem 116 may direct presentation subsystem 116 to update the presentation of the predicted set of values with a presentation of the updated presented set of values. In this way, for example, the requester may be quickly provided with an approximation of what the requested final values are without the delays typically associated with having to wait for an initial prediction of those final values (e.g., since such initially predicted values were obtained from the temporary data storage) and/or until one or more of the other subsets of the related data are obtained from the other data sources and/or processed. In addition, as indicated above, given that the predicted set of values (predicted without the other subsets of the related data) may reflect the final values (or close to the final values), quickly providing the presentation with the initially predicted set of values may provide the requester with the appearance of minimal delay from the time of the client request being initiated at the client device and the time at which the presentation of the "final" values are provided at the client device.

Examples Flowcharts

FIGS. 3-7 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 3:
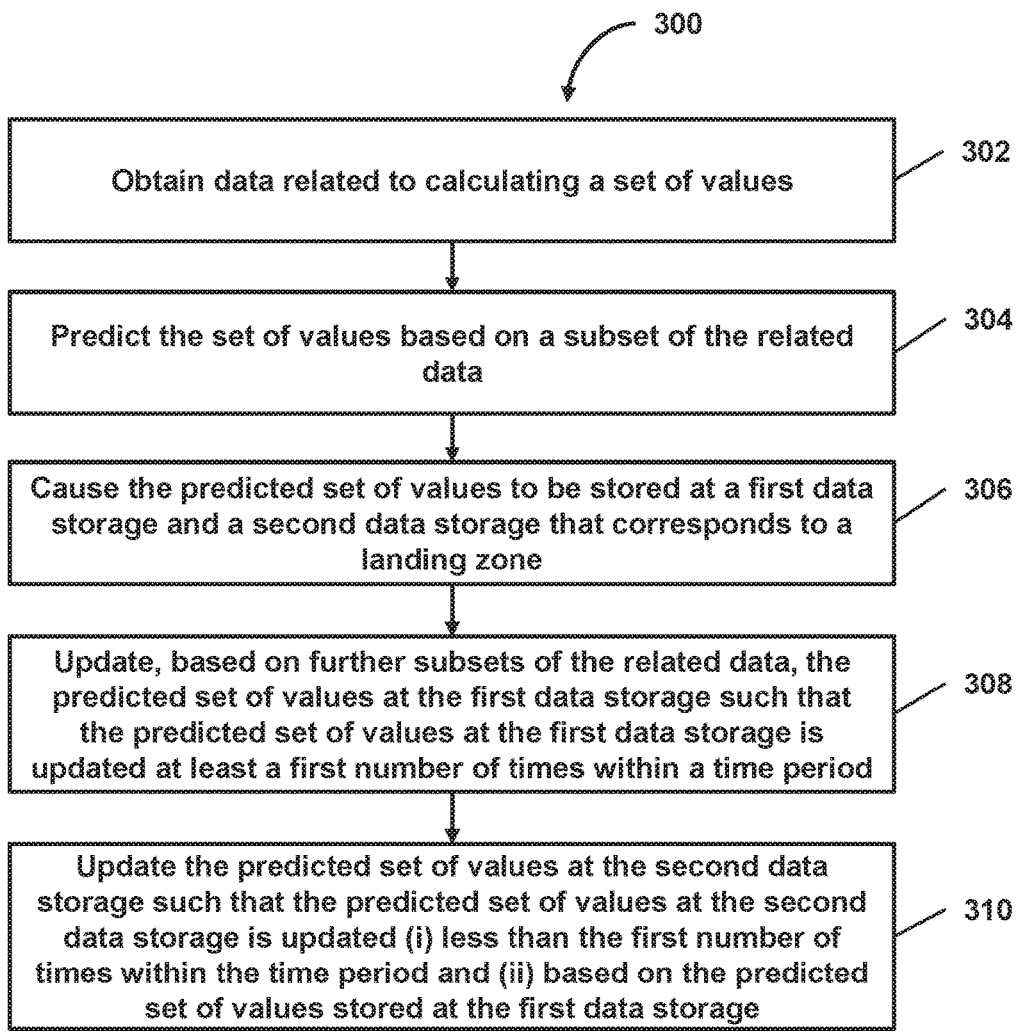
FIG. 3 shows a flowchart of a method of facilitating reduction of network resource usage with respect to writes to a data storage corresponding to a landing zone, in accordance with one or more embodiments.

FIG. 3 shows a flowchart of a method 700 of facilitating reduction of network resource usage with respect to writes to a data storage corresponding to a landing zone, in accordance with one or more embodiments.

In an operation 302, data related to calculating a set of values may be obtained. As an example, the related data may be obtained based on one or more queries. The queries may be performed to obtain respective portions of the related data from one or more data sources (e.g., local temporary data storage, other local data sources, external data sources, etc.).

Operation 302 may be performed by a query subsystem that is the same as or similar to query subsystem 112, in accordance with one or more embodiments.

In some embodiments, with respect to operation 302, a request for at least some values (of the set of values) may be obtained from a client device. A plurality of queries for the related data may be generated based on the request from the client device. The plurality of queries may be performed to obtain the related data. The obtainment of the request and/or the generation of the queries may be performed by a query subsystem that is the same as or similar to query subsystem 112, in accordance with one or more embodiments.

In an operation 304, the set of values may be predicted based on a subset of the related data. As an example, the predicted set of values may comprise approximations of what the values of the set of values would be had a complete set of data corresponding to the set of values been used to calculate the values of the set of values. As a further example, the related data may be the complete set of data for calculating the values of the set of values. The subset of the related data may be obtained responsive to performing one or more queries, and the subset of the related data may comprise data obtained prior to one or more other subsets of the related data being obtained. The set of values may, for instance, be predicted based on the subset of the related data without the other subsets of the related data. Operation 304 may be performed by a data prediction subsystem that is the same as or similar to data prediction subsystem 114, in accordance with one or more embodiments.

In an operation 306, the predicted set of values may be caused to be stored at a first data storage and a second data storage, where the second data storage corresponds to a landing zone. As an example, the landing zone may be the second data storage, a server (e.g., a physical server, a virtual server, etc.), an area (e.g., a web page, a node, etc.) hosted at the server, or other component via which a client device obtains data (e.g., at least some values of the predicted set of values, raw query results, or other data) or via which the client device interacts to have its requests handled. As another example, the first and second data storages may be server data storages, such as areas on one or more hard drives or other electronic storages (e.g., server cache, web cache, other temporary data storage, or other storage) hosted at a server, databases associated with a server, or other server data storages. The server data storages may be associated with the same server or different servers. Operation 306 may be performed by an update subsystem that is the same as or similar to update subsystem 116, in accordance with one or more embodiments.

In some embodiments, with respect to operation 306, compatibility information associated with the client device (that will interact with the landing zone) may be obtained, and the second data storage may be selected (for storage of versions of the predicted set of values) from among a plurality of data storages based on the compatibility information. As an example, the compatibility information may comprise information indicating one or more database management systems with which the client device is compatible or other information. The second data storage may be selected (for storage of versions of the predicted set of values) based on a determination that the second data storage uses at least one of the compatible database management systems (indicated by the compatibility information). The obtainment of the compatibility information and/or the selection of the second data storage may be performed by a landing zone subsystem that is the same as or similar to landing zone subsystem 120, in accordance with one or more embodiments.

In an operation 308, the predicted set of values stored at the first data storage may be updated based on further subsets of the related data at least a first number of times within a time period. As an example, the predicted set of values may initially be based on the subset of the related data (obtained prior to one or more other subsets of the related data being obtained) without the other subsets of the related data. As some of the other subsets of the related data are obtained, the initially-obtained subset of data and the obtained ones of the other subsets (of the related data) may be utilized to update the predicted set of values (e.g., to update the approximations of what the values of the set of values would be had a complete set of data corresponding to the set of values been used to calculate the values of the set of values). As another example, the predicted set of values stored at the first data storage may be periodically updated (e.g., every second or other rate) during the time period. As yet another example, the predicted set of values stored at the first data storage may be updated in real-time during the time period as the further subsets of the related data are being obtained. Operation 308 may be performed by prediction and/or update subsystems that are the same as or similar to prediction subsystem 114 and/or update subsystem 116, in accordance with one or more embodiments. As an example, prediction subsystem 114 may predict the set of values based on the initially-obtained subset of the related data and the obtained other subsets of the related data. As a further example, update subsystem 116 may cause the most recent version of the predicted set of values to be stored at the first data storage to replace the prior version of the predicted set of values stored at the first data storage.

In an operation 310, the predicted set of values stored at the second data storage (corresponding to a landing zone) may be updated (i) less than the first number of times within the time period and (ii) based on the predicted set of values stored at the first data storage. As an example, a version of the predicted set of values stored at the first data storage may be periodically transmitted to the second data storage (e.g., every 5 seconds, every minute, or other rate) to replace a version of the predicted set of values stored at the second data storage. Each of the periodically-transmitted versions may, for instance, be more recently updated than the respective replaced version of the predicted set of values stored at the second data storage. Operation 310 may be performed by an update subsystem that is the same as or similar to update subsystem 116, in accordance with one or more embodiments.

In some embodiments, with respect to operation 310, the number of times that the predicted set of values stored at the second data storage is updated within a given time period may be based on cost information, such as information indicating one or more costs associated with writing to the second data storage or other information. As an example, an update rate for updating the predicted set of values stored at the first data storage may be a first update rate, and an update rate for updating the predicted set of values stored at the second data storage may be a second update rate. The second update rate may be determined (as an update rate for updating the predicted set of values stored at the second data storage) based on the costs associated with writing to the second data storage. Such associated costs may, for instance, comprise a monetary cost for writing to the second data storage, a computer resource cost for writing the second data storage (e.g., bandwidth or other network resource usage amount or other computer resource cost), or other costs.

Figure 4:
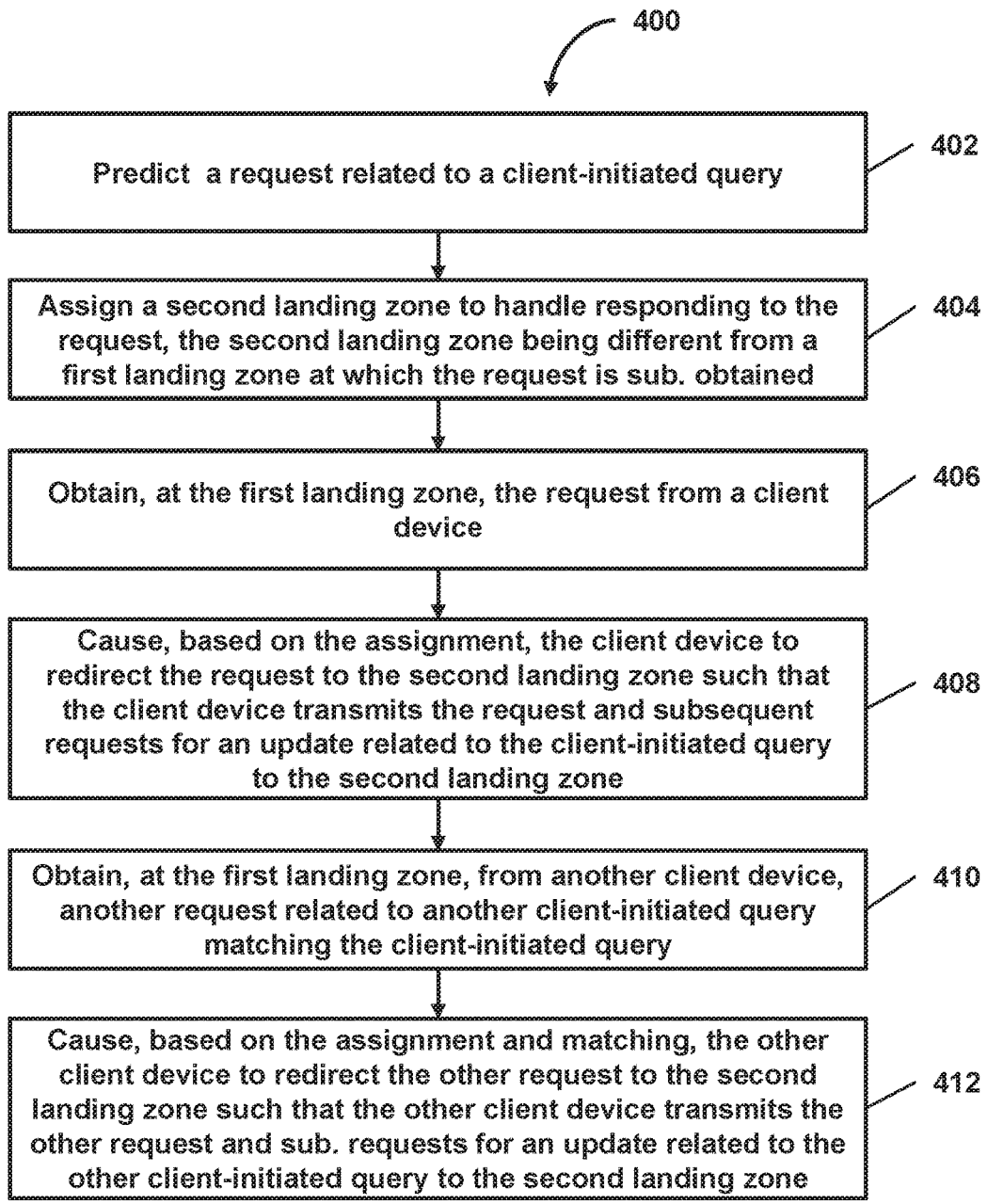
FIG. 4 shows a flowchart of a method of facilitating load reduction at a landing zone, in accordance with one or more embodiments.

FIG. 4 shows a flowchart of a method of facilitating load reduction at a landing zone, in accordance with one or more embodiments.

In an operation 402, a request related to a client-initiated query may be predicted. As an example, the query-related request may comprise a query submission related to the client-initiated query, an update request related to the client-initiated query, or other request. As another example, the query-related request may be predicted based on request history information, such as information indicating one or more queries initiated prior to the client-initiated query, information indicating a frequency of requests related to queries matching the client-initiated query, or other information. Operation 402 may be performed by a request prediction subsystem that is the same as or similar to request prediction subsystem 118, in accordance with one or more embodiments.

In an operation 404, a second landing zone may be assigned to handle responding to the query-related request, where the second landing zone is different from a first landing zone at which the query-related request is subsequently obtained. As an example, the first landing zone may be a default landing zone, and the second landing zone may be a query-specific landing zone. The first and second landing zones may each be a data storage (e.g., a database or other data storage), a server (e.g., a physical server, a virtual server, etc.), an area (e.g., a web page, a node, etc.) hosted at the server, or other component via which a client device obtains data or interacts to have its requests handled. Operation 404 may be performed by a landing zone subsystem that is the same as or similar to landing zone subsystem 120, in accordance with one or more embodiments.

In an operation 406, the query-related request may be obtained at the first landing zone from a client device. As an example, the client device may transmit the query-related request to the first landing zone based on the first landing zone being a prior landing zone with which the client device interacted, the first landing zone being a default landing zone, or other criteria.

Operation 406 may be performed by a landing zone subsystem that is the same as or similar to landing zone subsystem 120, in accordance with one or more embodiments.

In an operation 408, the client device may be caused to redirect the query-related request to the second landing zone based on the assignment to the second landing zone. As an example, responsive to the redirection, the client device may transmit the query-related request, subsequent requests for an update related to the client-initiated query, or other requests to the second landing zone. As a further example, responsive to the redirection, the client device may transmit the query-related request and the subsequent requests to the second landing zone without first transmitting the subsequent requests to the first landing zone. Operation 408 may be performed by a landing zone subsystem that is the same as or similar to landing zone subsystem 120, in accordance with one or more embodiments.

In some embodiments, with respect to operation 408, the client device may be caused to redirect the query-related request to the second landing zone by providing, to the client device, a redirection instruction, a reference associated with the second landing zone (e.g., an identifier or address associated with the second landing zone), or other information. As an example, responsive to being provided the redirection instruction and the second landing zone reference, the client device may process the redirection instruction and use the second landing zone reference to transmit the query-related request and the subsequent requests to the second landing zone (e.g., without first/initially transmitting the subsequent requests to the first landing zone).

In an operation 410, another request related to another client-initiated query (matching the client-initiated query) may be obtained at the first landing zone from another client device. As an example, the other client device may transmit the other query-related request to the first landing zone based on the first landing zone being a prior landing zone with which the other client device interacted, the first landing zone being a default landing zone, or other criteria. Operation 410 may be performed by a landing zone subsystem that is the same as or similar to landing zone subsystem 120, in accordance with one or more embodiments.

In an operation 412, the other client device may be caused to redirect the other query-related request to the second landing zone based on the assignment to the second landing zone and the matching. As an example, responsive to the redirection, the other client device may transmit the other query-related request, other subsequent requests for an update related to the other client-initiated query, or other requests to the second landing zone. As a further example, responsive to the redirection, the other client device may transmit the other query-related request and the other subsequent requests to the second landing zone without first transmitting the other subsequent requests to the first landing zone. Operation 412 may be performed by a landing zone subsystem that is the same as or similar to landing zone subsystem 120, in accordance with one or more embodiments.

In some embodiments, with respect to operation 412, the other client device may be caused to redirect the query-related request to the second landing zone by providing, to the other client device, a redirection instruction, a reference associated with the second landing zone (e.g., an identifier or address associated with the second landing zone), or other information. As an example, responsive to being provided the redirection instruction and the second landing zone reference, the other client device may process the redirection instruction and use the second landing zone reference to transmit the other query-related request and the other subsequent requests to the second landing zone (e.g., without first/initially transmitting the other subsequent requests to the first landing zone).

Figure 5:
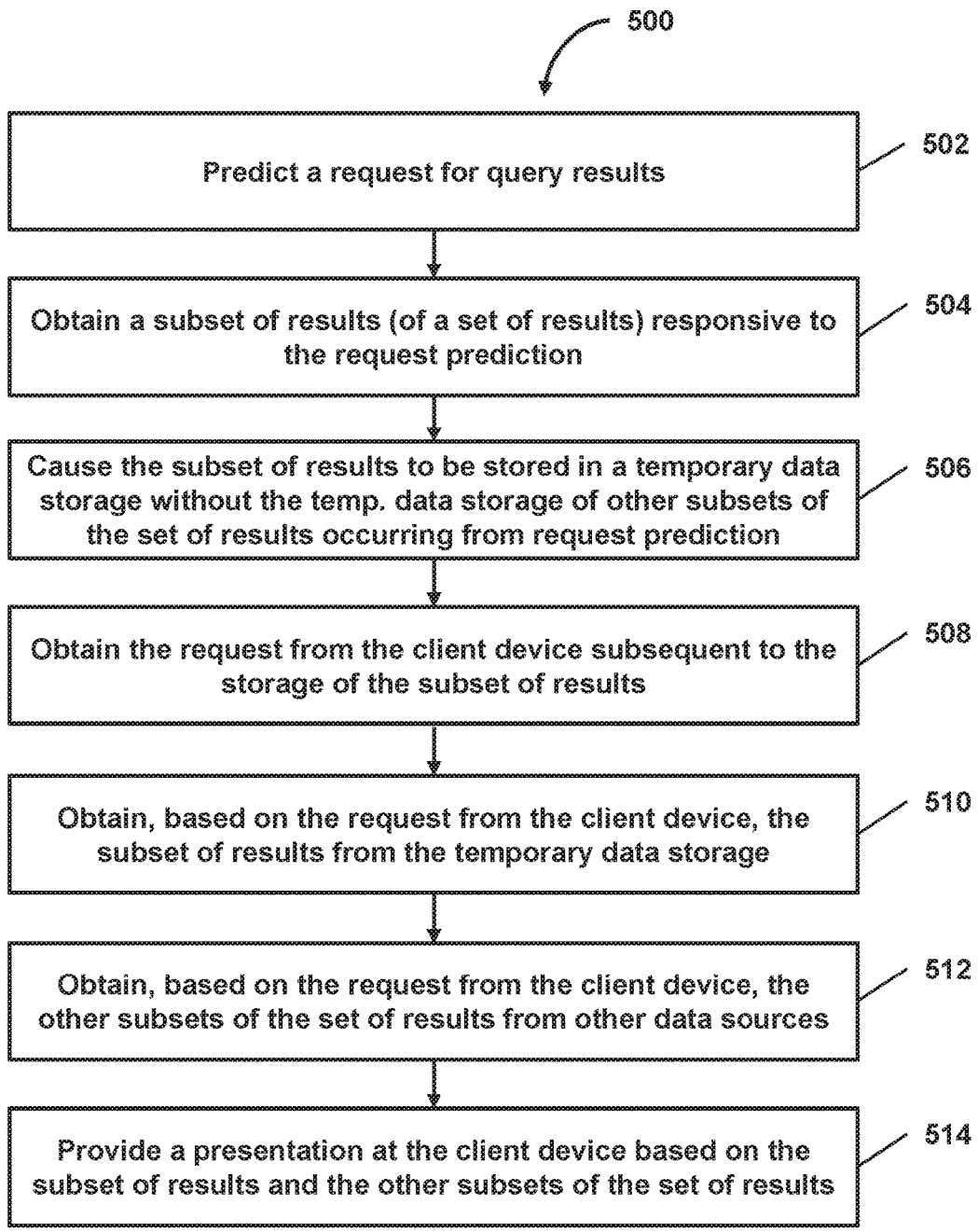
FIGS. 5-7 show flowcharts of methods of facilitating queries via request-prediction-based temporary storage of query results, in accordance with various embodiments.

FIG. 5 shows a flowchart of a method of facilitating queries via request-prediction-based temporary storage of query results, in accordance with one or more embodiments.

In an operation 502, a request for query results may be predicted. As an example, the request may comprise a query submission (or a client-initiated query), an update request related to the client-initiated query, or other request. As another example, the query-related request may be predicted based on request history information, such as information indicating one or more queries initiated prior to the client-initiated query, information indicating a frequency of requests related to queries matching the client-initiated query, or other information. Operation 502 may be performed by a request prediction subsystem that is the same as or similar to request prediction subsystem 118, in accordance with one or more embodiments.

In an operation 504, a subset of results (of a set of results) may be obtained responsive to the request prediction. As an example, the set of results (of which the obtained results is a subset) may comprise results that would have been obtained to respond to the request had the request been obtained from a client device. One or more queries may be performed responsive to the request prediction to obtain the subset of results. Operation 504 may be performed by a query subsystem that is the same as or similar to query subsystem 112, in accordance with one or more embodiments.

In an operation 506, the subset of results may be caused to be stored in a temporary data storage without storage of other subsets of the set of results in the temporary data storage occurring from the request prediction. The temporary data storage may comprise a server cache, a web cache, memory cache, or other temporary data storage. As an example, no performance of queries for the other subsets (of the set of results) may be triggered by the request prediction. As another example, the performance of queries via which the subset of results is obtained may be stopped before the other subsets (of the set of results) are obtained. As yet another example, even if the other subsets are obtained (e.g., via one or more queries responsive to the request prediction), a determination may be made not to store the other subsets (of the set of results) in the temporary data storage. Operation 506 may be performed by a temporary storage subsystem that is the same as or similar to temporary storage subsystem 122, in accordance with one or more embodiments.

In some embodiments, with respect to operations 504 and 506, the obtainment and/or storage of the subset of results may be performed based on frequency information, cost information, preference information, or other information. The frequency information may comprise information indicating a frequency of requests matching the request or other information. The cost information may comprise information indicating costs for storing data in the temporary data storage, information indicating costs for performing respective queries, or other information. The preference information may comprise information indicating one or more preferences related to a manner in which to present data or other information. The preferences (related to a manner in which to present data) may comprise a preference for a sorting order for presenting data, a preference for an amount of data to be presented at a given time, a preference for a format in which to present data, or other preferences. The foregoing obtainment and/or storage of the subset of results (and/or determination of the information on which the obtainment and/or storage are based) may be performed by a query subsystem or a temporary storage subsystem that are the same as or similar to query subsystem 112 or temporary storage subsystem 122, in accordance with one or more embodiments.

In an operation 508, the request may be obtained from the client device subsequent to the storage of the subset of results. Operation 508 may be performed by a query subsystem that is the same as or similar to query subsystem 112, in accordance with one or more embodiments.

In an operation 510, the subset of results may be obtained from the temporary data storage based on the request from the client device. As an example, the temporary data storage may first be checked to determine whether results relevant to the request exist in the temporary data storage. As another example, the subset of results may be assigned one or more attributes associated with the request, and the attributes of the request may be compared against a collection of assigned attribute sets to determine whether a match exists between the attributes of the request and one of the assigned attributes sets. If, for instance, the attributes of the request matches an assigned attribute set, the assigned attribute set may be used to obtain the subset of results stored in the temporary data storage. Operation 510 may be performed by a query subsystem and/or a temporary storage subsystem that are the same as or similar to query subsystem 112 and/or temporary storage subsystem 122, in accordance with one or more embodiments. As an example, query subsystem 112 may direct temporary storage subsystem 118 to check for whether results relevant to the request is stored in the temporary data storage (e.g., responsive to query subsystem 112 identifying a match between the attributes of the request and one of the assigned attribute sets or responsive to one or more other conditions).

In an operation 512, the other subsets of the set of results from one or more other data sources. As an example, responsive to a determination that the other subsets are not stored in the temporary data storage, one or more queries to the other data sources may be performed to obtain the other subsets (of the set of results) from the other data sources. Operation 512 may be performed by a query subsystem that is the same as or similar to query subsystem 112, in accordance with one or more embodiments.

In an operation 514, a presentation may be provided at the client device based on the subset of results and the other subsets of the set of results. As an example, the presentation provided at the client device may comprise a representation of the subset of results, a representation of the other subsets of the set of results, or other representation of results.

Operation 512 may be performed by a presentation subsystem that is the same as or similar to presentation subsystem 124, in accordance with one or more embodiments.

Figure 6:
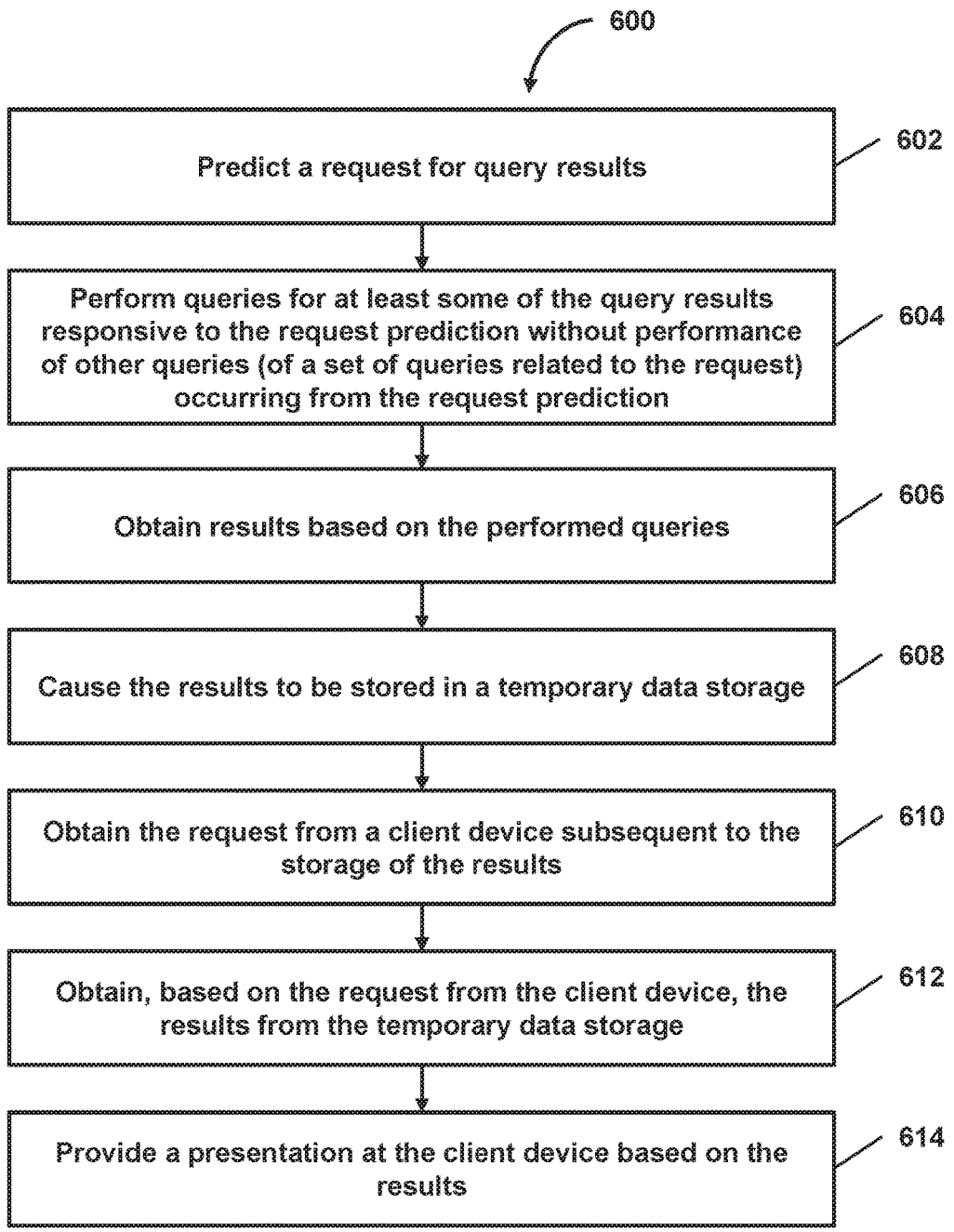

FIG. 6 shows a flowchart of a method of facilitating queries via request-prediction-based temporary storage of query results, in accordance with one or more embodiments.

In an operation 602, a request for query results may be predicted. As an example, the request may comprise a query submission (or a client-initiated query), an update request related to the client-initiated query, or other request. As another example, the query-related request may be predicted based on request history information, such as information indicating one or more queries initiated prior to the client-initiated query, information indicating a frequency of requests related to queries matching the client-initiated query, or other information. Operation 602 may be performed by a request prediction subsystem that is the same as or similar to request prediction subsystem 118, in accordance with one or more embodiments.

In an operation 604, queries for at least some of the query results may be performed responsive to the request prediction without performance of one or more other queries (of a set of queries related to the request) occurring from the request prediction. As an example, the set of queries may comprise queries that would have been performed to respond to the request had the request been obtained from a client device, and no performance of the other queries (of the set of queries) may be triggered by the request prediction. Operation 604 may be performed by a query subsystem that is the same as or similar to query subsystem 112, in accordance with one or more embodiments.

In an operation 606, results may be obtained based on the performed queries. As an example, the obtained results may be a subset of a set of results that would have been obtained to respond to the request had the request been obtained from the client device. As another example, no obtainment of other subsets of the set of results may be triggered by the request prediction.

Operation 604 may be performed by a query subsystem that is the same as or similar to query subsystem 112, in accordance with one or more embodiments.

In some embodiments, with respect to operations 604 and 606, cost information may be determined. As an example, the cost information may indicate costs for performing respective queries (of the set of queries that would have been performed to respond to the request had the request been obtained from the client device). The queries to be performed may be selected from among the set of queries based on the cost information. The results may be obtained based on the performance of the selected queries.

In an operation 608, the results (obtained based on the performed queries) may be caused to be stored in a temporary data storage. In one use case, no storage of other subsets of the set of results (that would have been obtained to respond to the request had the request been obtained from the client device) in the temporary data storage may occur from the request prediction. As an example, no obtainment of the other subsets of the set of results may be triggered by the request prediction. As another example, even if the other subsets are obtained (e.g., via one or more queries responsive to the request prediction), a determination may be made not to store the other subsets (of the set of results) in the temporary data storage. Operation 608 may be performed by a temporary storage subsystem that is the same as or similar to temporary storage subsystem 122, in accordance with one or more embodiments.

In an operation 610, the request may be obtained from the client device subsequent to the storage of the results. Operation 610 may be performed by a query subsystem that is the same as or similar to query subsystem 112, in accordance with one or more embodiments.

In an operation 612, the results may be obtained from the temporary data storage based on the request from the client device. As an example, the temporary data storage may first be checked to determine whether results relevant to the request exist in the temporary data storage.

As another example, the subset of results may be assigned one or more attributes associated with the request, and the attributes of the request may be compared against a collection of assigned attribute sets to determine whether a match exists between the attributes of the request and one of the assigned attributes sets. If, for instance, the attributes of the request matches an assigned attribute set, the assigned attribute set may be used to obtain the subset of results stored in the temporary data storage. Operation 612 may be performed by a query temporary subsystem and/or a temporary storage subsystem that are the same as or similar to query subsystem 112 and/or temporary storage subsystem 122, in accordance with one or more embodiments.

In an operation 614, a presentation may be provided at the client device based on the results (obtained from the temporary data storage). As an example, the presentation provided at the client device may comprise a representation of the results (obtained from the temporary data storage) or other representation of other results. Operation 614 may be performed by a presentation subsystem that is the same as or similar to presentation subsystem 124, in accordance with one or more embodiments.

Figure 7:
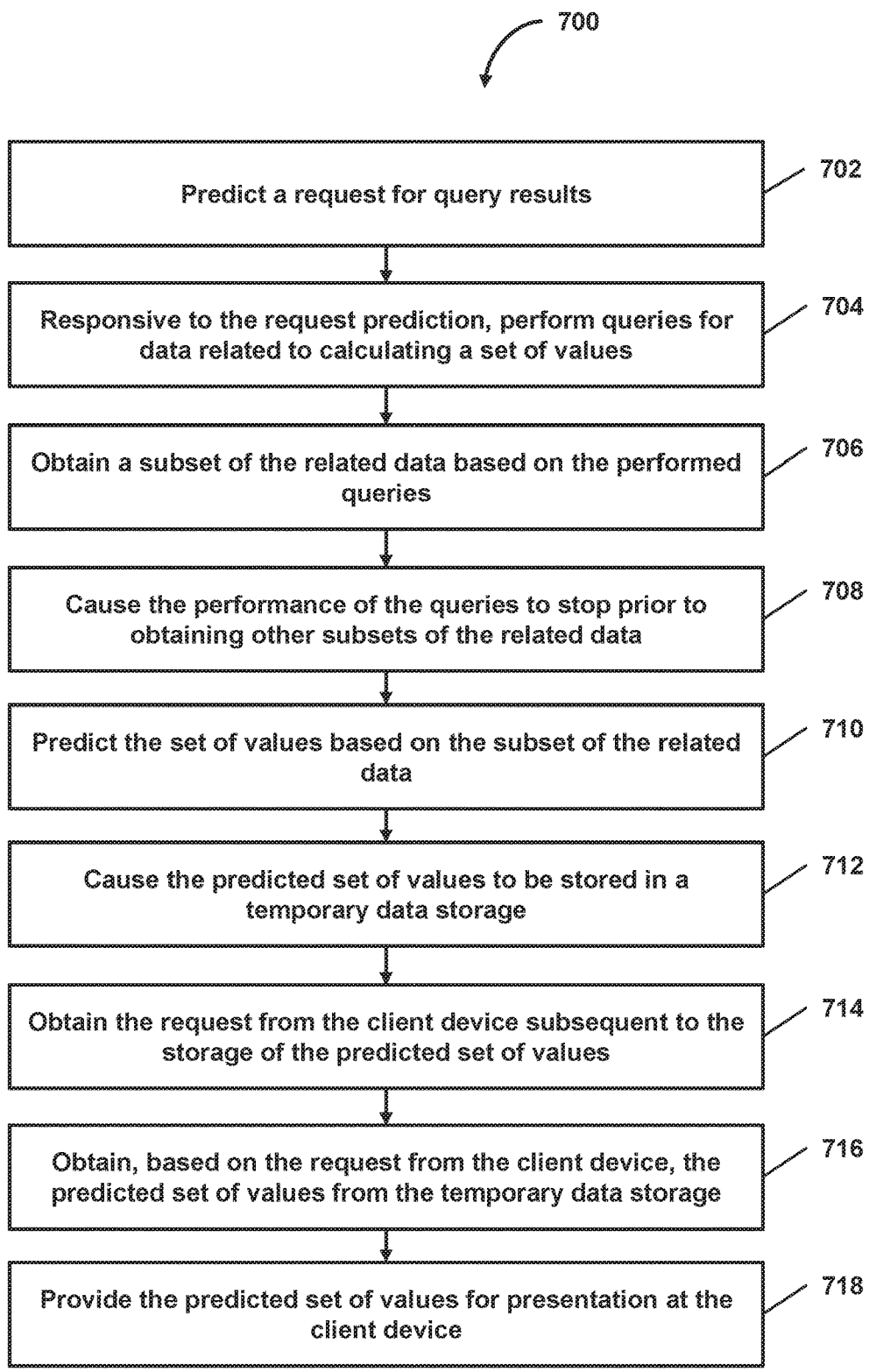

FIG. 7 shows a flowchart of a method of facilitating queries via request-prediction-based temporary storage of query results, in accordance with one or more embodiments.

In an operation 702, a request for query results may be predicted. As an example, the request may comprise a query submission (or a client-initiated query), an update request related to the client-initiated query, or other request. As another example, the query-related request may be predicted based on request history information, such as information indicating one or more queries initiated prior to the client-initiated query, information indicating a frequency of requests related to queries matching the client-initiated query, or other information. Operation 702 may be performed by a request prediction subsystem that is the same as or similar to request prediction subsystem 118, in accordance with one or more embodiments.

In an operation 704, responsive to the request prediction, queries for data related to calculating a set of values may be performed. As an example, one or more other queries of a set of queries related to the request may also be performed responsive to the request prediction. The set of queries may, for instance, comprise queries that would have been performed to respond to the request had the request been obtained from a client device. As another example, no performance of the other queries (of the set of queries) may be triggered by the request prediction. Operation 704 may be performed by a query subsystem that is the same as or similar to query subsystem 112, in accordance with one or more embodiments.

In some embodiments, with respect to operation 704, the queries to be performed may be selected from among a set of queries that would have been performed to respond to the request had the request been obtained from the client device. As an example, the queries to be performed may be selected from among the set of queries based on frequency information, cost information, preference information, or other information. The frequency information may comprise information indicating a frequency of requests matching the request or other information. The cost information may comprise information indicating costs for performing respective queries of the set of queries or other information. The preference information may comprise information indicating one or more preferences related to a manner in which to present data or other information. The preferences (related to a manner in which to present data) may comprise a preference for a sorting order for presenting data, a preference for an amount of data to be presented at a given time, a preference for a format in which to present data, or other preferences. The foregoing selection and/or determination of the information (on which the selection is based) may be performed by a query subsystem that is the same as or similar to query subsystem 112, in accordance with one or more embodiments.

In an operation 706, a subset of the related data may be obtained based on the performed queries. As an example, the related data may be the complete set of data for calculating the values of the set of values. As another example, the subset of the related data may comprise data obtained prior to one or more other subsets of the related data being obtained. Operation 706 may be performed by a query subsystem that is the same as or similar to query subsystem 112, in accordance with one or more embodiments.

In an operation 708, the performance of the queries may be caused to stop prior to obtaining one or more other subsets of the related data. In one scenario, the performance of the queries may be caused to stop (prior to obtaining the other subsets of the related data) based on cost information. As an example, the cost information may comprise information indicating costs for performing respective ones of the queries, information indicating costs for storing data in the temporary data storage, or other information. Operation 708 may be performed by a query subsystem that is the same as or similar to query subsystem 112, in accordance with one or more embodiments.

In an operation 710, the set of values may be predicted based on the subset of the related data. As an example, the predicted set of values may comprise approximations of what the values of the set of values would be had a complete set of data corresponding to the set of values been used to calculate the values of the set of values. As a further example, the related data may be the complete set of data for calculating the values of the set of values. The subset of the related data may comprise data obtained prior to one or more other subsets of the related data being obtained. The set of values may, for instance, be predicted based on the subset of the related data without the other subsets of the related data. Operation 710 may be performed by a data prediction subsystem that is the same as or similar to data prediction subsystem 114, in accordance with one or more embodiments.

In an operation 712, the predicted set of values may be caused to be stored in a temporary data storage. Operation 712 may be performed by a data prediction subsystem that is the same as or similar to data prediction subsystem 114, in accordance with one or more embodiments.

In an operation 714, the request may be obtained from the client device subsequent to the storage of the predicted set of values. Operation 714 may be performed by a query subsystem that is the same as or similar to query subsystem 112, in accordance with one or more embodiments.

In an operation 716, the predicted set of values may be obtained from the temporary data storage based on the request from the client device. As an example, the temporary data storage may first be checked to determine whether results relevant to the request exist in the temporary data storage. As another example, the predicted set of values may be assigned one or more attributes associated with the request, and the attributes of the request may be compared against a collection of assigned attribute sets to determine whether a match exists between the attributes of the request and one of the assigned attributes sets. If, for instance, the attributes of the request matches an assigned attribute set, the assigned attribute set may be used to obtain the predicted set of values stored in the temporary data storage. Operation 716 may be performed by a query temporary subsystem and/or a temporary storage subsystem that are the same as or similar to query subsystem 112 and/or temporary storage subsystem 122, in accordance with one or more embodiments.

In an operation 718, the predicted set of values may be provided for presentation at the client device. As an example, the presentation at the client device may comprise a representation of the predicted set of values. Operation 718 may be performed by a presentation subsystem that is the same as or similar to presentation subsystem 124, in accordance with one or more embodiments.

In some embodiments, the various computers and subsystems illustrated in FIG. 1 may include one or more computing devices that are programmed to perform the functions described herein. The computing devices may include one or more electronic storages (e.g., prediction and visualization database(s) 132 or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-124 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-124 described herein is for illustrative purposes, and is not intended to be limiting, as any of subsystems 112-124 may provide more or less functionality than is described. For example, one or more of subsystems 112-124 may be eliminated, and some or all of its functionality may be provided by other ones of subsystems 112-124. As another example, additional subsystems may be programmed to perform some or all of the functionality attributed herein to one of subsystems 112-124.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A method of reducing network resource usage, the method being implemented by a computer system that comprises one or more processors executing computer program instructions that, when executed, perform the method, the method comprising:

obtaining, based on one or more queries, data related to calculating a set of values;

approximating the set of values based on a subset of the related data;

causing the approximated set of values to be stored at a first server data storage and a second server data storage, the second server data storage corresponding to a landing zone via which a client device obtains at least some approximated values of the approximated set of values;

continuously updating, based on further subsets of the related data, the approximated set of values stored at the first server data storage such that the approximated set of values stored at the first server data storage is updated at least a first number of times within a first time period; and continuously updating the approximated set of values stored at the second server data storage corresponding to the landing zone such that the approximated set of values stored at the second server data storage is updated less than the first number of times within the first time period, wherein continuously updating the approximated set of values stored at the second server data storage comprises transmitting the approximated set of values stored at the first server data storage to the second server data storage to replace the approximated set of values stored at the second server data storage.

2. The method of claim 1, wherein the approximated set of values comprise approximations of what the values of the set of values would be had a complete set of data corresponding to the set of values been used to calculate the values of the set of values.

3. The method of claim 1, wherein continuously updating the approximated set of values stored at the second server data storage comprises periodically transmitting, during the first time period, a version of the approximated set of values stored at the first server data storage to the second server data storage to replace a version of the approximated set of values stored at the second server data storage, each of the periodically-transmitted versions being more recently updated than the respective replaced version of the approximated set of values stored at the second server data storage.

4. The method of claim 1, wherein obtaining the related data comprises continuously obtaining subsets of the related data based on the one or more queries during the first time period, the subset of the related data being obtained at a first time before the further subsets of the related data are obtained.

5. The method of claim 1, wherein continuously updating the approximated set of values stored at the first server data storage comprises (i) periodically updating the approximated set of values stored at the first server data storage during the first time period or (ii) updating the approximated set of values stored at the first server data storage in real-time during the first time period as the further subsets of the related data are being obtained.

6. The method of claim 1, further comprising:
obtaining, from the client device, a request for at least some values of the set of values; and
generating, based on the request, a plurality of queries for the related data,
wherein obtaining the related data comprises obtaining the related data based on the plurality of queries.

7. The method of claim 1, further comprising:
obtaining, from the client device, a request for at least some values of the set of values;
obtaining compatibility information associated with the client device; and
selecting, based on the compatibility information, the second server data storage for storage of versions of the approximated set of values, the second server data storage being selected from among a plurality of server data storages.

8. The method of claim 1, wherein the approximated set of values stored at the first server data storage is updated at a first update rate, and the approximated set of values stored at the second server data storage is updated at a second update rate different from the first update rate.

9. The method of claim 8, further comprising:
determining, based on a cost associated with writing to the second server data storage, the second update rate as an update rate for updating the approximated set of values stored at the second server data storage.

10. The method of claim 9, wherein the associated cost comprises a monetary cost for writing to the second server data storage.

11. A system comprising:
a computer system that comprises one or more processors programmed with computer program instructions that, when executed, cause the computer system to:
obtain, based on one or more queries, data related to calculating a set of values;
approximate the set of values based on a subset of the related data;
cause the approximated set of values to be stored at a first server data storage and a second server data storage, the second server data storage corresponding to a landing zone via which a client device obtains at least some approximated values of the approximated set of values;
continuously update, based on further subsets of the related data, the approximated set of values stored at the first server data storage such that the approximated set of values stored at the first server data storage is updated at least a first number of times within a first time period; and
continuously update the approximated set of values stored at the second server data storage corresponding to the landing zone such that the approximated set of values stored at the second server data storage is updated less than the first number of times within the first time period,
wherein continuously updating the approximated set of values stored at the second server data storage comprises transmitting the approximated set of values stored at the first server data storage to the second server data storage to replace the approximated set of values stored at the second server data storage.

12. The system of claim 11, wherein the approximated set of values comprise approximations of what the values of the set of values would be had a complete set of data corresponding to the set of values been used to calculate the values of the set of values.

13. The system of claim 11, wherein continuously updating the approximated set of values stored at the second server data storage comprises periodically transmitting, during the first time period, a version of the approximated set of values stored at the first server data storage to the second server data storage to replace a version of the approximated set of values stored at the second server data storage, each of the periodically-transmitted versions being more recently updated than the respective replaced version of the approximated set of values stored at the second server data storage.

14. The system of claim 11, wherein the computer system is caused to obtain the related data by continuously obtaining subsets of the related data based on the one or more queries during the first time period, the subset of the related data being obtained at a first time before the further subsets of the related data are obtained.

15. The system of claim 11, wherein continuously updating the approximated set of values stored at the first server data storage comprises (i) periodically updating the approximated set of values stored at the first server data storage during the first time period or (ii) updating the approximated set of values stored at the first server data storage in real-time during the first time period as the further subsets of the related data are being obtained.

16. The system of claim 11, wherein the computer system is caused to:
    obtain, from the client device, a request for at least some values of the set of values;
    generate, based on the request, a plurality of queries for the related data; and
    obtain the related data by obtaining the related data based on the plurality of queries.

17. The system of claim 11, wherein the computer system is caused to:
    obtain, from the client device, a request for at least some values of the set of values;
    obtain compatibility information associated with the client device; and
    select, based on the compatibility information, the second server data storage for storage of versions of the approximated set of values, the second server data storage being selected from among a plurality of server data storages.

18. The system of claim 11, wherein the approximated set of values stored at the first server data storage is updated at a first update rate, and the approximated set of values stored at the second server data storage is updated at a second update rate different from the first update rate.

19. The system of claim 18, wherein the computer system is caused to:
    determine, based on a cost associated with writing to the second server data storage, the second update rate as an update rate for updating the approximated set of values stored at the second server data storage.

20. A method implemented by a computer system that comprises one or more processors executing computer program instructions that, when executed, perform the method, the method comprising:
    obtaining, from a client device, a request for a set of values;
    obtaining, based on the request, data related to calculating the set of values;
    approximating the set of values based on a subset of the related data;
    causing the approximated set of values to be stored at a first server data storage and a second server data storage, the second server data storage corresponding to a landing zone via which the client device obtains at least some approximated values of the approximated set of values;
    continuously updating, based on further subsets of the related data, the approximated set of values stored at the first server data storage such that the approximated set of values stored at the first server data storage is updated at least a first number of times within a first time period; and
    continuously updating the approximated set of values stored at the second server data storage corresponding to the landing zone such that the approximated set of values stored at the second server data storage is updated less than the first number of times within the first time period,
    wherein continuously updating the approximated set of values stored at the second server data storage comprises periodically transmitting, during the first time period, a version of the approximated set of values stored at the first server data storage to the second server data storage to replace a version of the approximated set of values stored at the second server data storage, each of the periodically-transmitted versions being more recently updated than the respective replaced version of the approximated set of values stored at the second server data storage.

* * * * *